US011075990B2

(12) United States Patent
Himura et al.

(10) Patent No.: US 11,075,990 B2
(45) Date of Patent: Jul. 27, 2021

(54) CLOUD USAGE ASSISTING APPARATUS AND CLOUD USAGE ASSISTING METHOD

(71) Applicant: HITACHI, LTD., Tokyo (JP)

(72) Inventors: Yosuke Himura, Tokyo (JP); Shinichi Hayashi, Tokyo (JP); Takashi Tameshige, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/820,891

(22) Filed: Mar. 17, 2020

(65) Prior Publication Data

US 2020/0382592 A1 Dec. 3, 2020

(30) Foreign Application Priority Data

May 30, 2019 (JP) .............................. JP2019-100886

(51) Int. Cl.
*H04L 29/08* (2006.01)
*G06F 9/451* (2018.01)
(Continued)

(52) U.S. Cl.
CPC .......... *H04L 67/1097* (2013.01); *G06F 9/453* (2018.02); *H04L 41/0813* (2013.01); *H04L 41/0826* (2013.01); *H04L 41/0883* (2013.01); *H04L 41/0893* (2013.01); *H04L 41/14* (2013.01); *H04L 41/147* (2013.01);
(Continued)

(58) Field of Classification Search
CPC ... H04L 29/08135–08288; H04L 41/08–0806; H04L 41/0813–0836; H04L 41/0876–0893; H04L 41/12–16; H04L 41/22; H04L 41/5041–5054; H04L 41/5096; H04L 43/04–045; H04L 67/10; H04L 67/1002–1036

See application file for complete search history.

(56) References Cited

U.S. PATENT DOCUMENTS 8,005,879 B2 * 8/2011 Bornhoevd ............... G06F 8/60
707/899
9,747,136 B2 * 8/2017 Sathyamurthy ....... G06F 9/5077
(Continued)

OTHER PUBLICATIONS

Office Action received in corresponding United Kingdom Application No. GB2004036.6 dated Oct. 23, 2020.

*Primary Examiner* — Brendan Y Higa
(74) *Attorney, Agent, or Firm* — Mattingly & Malur, PC

(57) ABSTRACT

The present invention provides a cloud usage assisting apparatus which assists determination of an optimal cloud usage configuration. The cloud usage assisting apparatus calculates changes in performance and cost of a service which are to occur when each of actions is executed and a configuration change is made, based on menu information, storage resource configuration information, and monitoring information, each of the actions being an action in which at least one of the configuration changes of changing of a menu of the storage service involving one cloud, changing of the menu involving different clouds, and changing of a parameter that changes the configurations of the storage resources in the menu are executed on storage resources provided by one or more clouds, and determines the action as a recommended candidate when the action improves at least one of the performance and the cost.

9 Claims, 33 Drawing Sheets

(51) Int. Cl.
*H04L 12/24* (2006.01)
*H04L 12/26* (2006.01)

(52) U.S. Cl.
CPC .......... *H04L 41/22* (2013.01); *H04L 41/5054* (2013.01); *H04L 43/045* (2013.01)

(56) References Cited

U.S. PATENT DOCUMENTS

| | | |
|---|---|---|
| 10,171,383 B2 * | 1/2019 | Johnston .................... G06F 8/65 |
| 10,547,521 B1 * | 1/2020 | Roy .................... H04L 43/0876 |
| 2013/0339419 A1 | 12/2013 | Emaru |
| 2014/0207944 A1 | 7/2014 | Emaru |
| 2016/0189070 A1 | 6/2016 | Yamasaki et al. |
| 2016/0234073 A1 * | 8/2016 | Maes ...................... H04L 67/10 |
| 2020/0084161 A1 * | 3/2020 | Paul ...................... H04L 47/822 |

* cited by examiner

| CLOUD | REGION | STORAGE SERVICE CATEGORY | SERVICE TYPE | UNIT PRICE | IOPS | VOLUME CAPACITY SPECIFICATION UNIT | MAXIMUM VOLUME CAPACITY |
|---|---|---|---|---|---|---|---|
| Private1 | Region1-1 | Block | Grade1-1-B-1 | xxx [$/ALLOCATED GB] | 1000 [IOPS/Vol] | 1 [GB] | 2000 [GB] |
| Private1 | Region1-1 | Block | Grade1-1-B-2 | xxx [$/ALLOCATED GB] | 100 [IOPS/Vol] | 1 [GB] | 2000 [GB] |

FIG. 4A

| CLOUD | REGION | STORAGE SERVICE CATEGORY | SERVICE TYPE | UNIT PRICE | IOPS UNIT | MAXIMUM IOPS | VOLUME CAPACITY SPECIFICATION UNIT | MAXIMUM VOLUME CAPACITY |
|---|---|---|---|---|---|---|---|---|
| Public2 | Region2-1 | Block | Grade2-1-B-1 | xxx [$/ALLOCATED GB] | 10 [IOPS/GB] | 1000 [IOPS/Vol] | 1 [GB] | 2000 [GB] |
| Public2 | Region2-1 | Block | Grade2-1-B-2 | xxx [$/ALLOCATED GB] | 5 [IOPS/GB] | 500 [IOPS/Vol] | 1 [GB] | 2000 [GB] |

FIG. 4B

| CLOUD | REGION | STORAGE SERVICE CATEGORY | SERVICE TYPE | UNIT PRICE | IOPS | VOLUME CAPACITY |
|---|---|---|---|---|---|---|
| Public3 | Region3-1 | Block | Grade3-1-B-1 | xxx [$/Vol] | 500 [IOPS/Vol] | 1000 [GB] |
| Public3 | Region3-1 | Block | Grade3-1-B-2 | xxx [$/Vol] | 500 [IOPS/Vol] | 100 [GB] |

FIG. 4C

| CLOUD | REGION | STORAGE SERVICE CATEGORY | SERVICE TYPE | UNIT PRICE | IOPS | THROUGHPUT |
|---|---|---|---|---|---|---|
| Public2 | Region2-1 | File | Grade2-1-F-1 | xxx [$/USED GB] | | 0.01MB/s/GB |
| Public2 | Region2-1 | Object | Grade2-1-O-1 | xxx [$/USED GB] | | |

FIG. 4D

MENU INFORMATION MANAGEMENT TABLE 5001

| CLOUD 6001 | REGION 6002 | STORAGE SERVICE CATEGORY 6003 | SERVICE TYPE 6004 | UNIT PRICE 6005 | IOPS UNIT 6006 | MAXIMUM IOPS 6007 | VOLUME CAPACITY SPECIFICATION UNIT 6008 | MAXIMUM VOLUME CAPACITY 6009 |
|---|---|---|---|---|---|---|---|---|
| Private1 | Region1-1 | Block | Grade1-1-B-1 | xxx [$/ALLOCATED GB] | 1000 [IOPS/Vol] | 1000 [IOPS/Vol] | 1 [GB] | 2000 [GB] |
| Private1 | Region1-1 | Block | Grade1-1-B-2 | xxx [$/ALLOCATED GB] | 100 [IOPS/Vol] | 100 [IOPS/Vol] | 1 [GB] | 2000 [GB] |
| Public2 | Region2-1 | Block | Grade2-1-B-1 | xxx [$/ALLOCATED GB] | 10 [IOPS/GB] | 1000 [IOPS/Vol] | 1 [GB] | 2000 [GB] |
| Public2 | Region2-1 | Block | Grade2-1-B-2 | xxx [$/ALLOCATED GB] | 5 [IOPS/GB] | 500 [IOPS/Vol] | 1 [GB] | 2000 [GB] |
| Public3 | Region3-1 | Block | Grade3-1-B-1 | xxx [$/Vol] | 500 [IOPS/Vol] | 500 [IOPS/Vol] | 1000 [GB] | 1000 [GB] |
| Public3 | Region3-1 | Block | Grade3-1-B-2 | xxx [$/Vol] | 500 [IOPS/Vol] | 500 [IOPS/Vol] | 100 [GB] | 100 [GB] |

FIG. 6A

CONFIGURATION INFORMATION
MANAGEMENT TABLE
(BEFORE CONFIGURATION CHANGE)  5002

COMPUTING RESOURCE CONFIGURATION INFORMATION

| NODE ID | NODE TYPE | GROUP ID | ROLE | CLOUD | END POINT |
|---|---|---|---|---|---|
| VM1 | VM | App1 | App | Private1 | x.x.x.x |
| VM2 | VM | App2 | App | Private1 | x.x.x.x |

STORAGE RESOURCE CONFIGURATION INFORMATION

| NODE ID | GROUP ID | ROLE | CATEGORY | CLOUD | SERVICE TYPE | CAPACITY | PERFORMANCE | DATA PROTOCOL |
|---|---|---|---|---|---|---|---|---|
| Data3 | App1 | Disk1 | Block | Private1 | Grade1-1-B-1 | 100 [GB] | 1000 [IOPS] | Block(FC) |
| Data4 | App1 | Disk2 | Block | Private1 | Grade1-1-B-1 | 100 [GB] | 1000 [IOPS] | Block(FC) |
| Data5 | App2 | Disk1 | Block | Private1 | Grade1-1-B-2 | 50 [GB] | 100 [IOPS] | Block(FC) |
| Data6 | App2 | Disk2 | Block | Private1 | Grade1-1-B-2 | 50 [GB] | 100 [IOPS] | Block(FC) |

DATA FLOW CONFIGURATION INFORMATION

| NODE ID | COUPLING DESTINATION NODE ID | RW TYPE | DATA PROTOCOL |
|---|---|---|---|
| VM1 | Data3 | RW | Block(FC) |
| VM1 | Data4 | RW | Block(FC) |
| VM2 | Data5 | RW | Block(FC) |
| VM2 | Data6 | RW | Block(FC) |

FIG. 6B

CONFIGURATION INFORMATION
MANAGEMENT TABLE
(AFTER CONFIGURATION CHANGE) 5002

COMPUTING RESOURCE CONFIGURATION INFORMATION

| NODE ID | NODE TYPE | GROUP ID | ROLE | CLOUD | END POINT |
|---------|-----------|----------|------|----------|-----------|
| VM1 | VM | App1 | App | Private1 | x.x.x.x |
| VM2 | VM | App2 | App | Public2 | x.x.x.x |

STORAGE RESOURCE CONFIGURATION INFORMATION

| NODE ID | GROUP ID | ROLE | CATEGORY | CLOUD | SERVICE TYPE | CAPACITY | PERFORMANCE | DATA PROTOCOL |
|---------|----------|------|----------|----------|--------------|----------|-------------|---------------|
| Data3 | App1 | Disk1 | Block | Private1 | Grade1-1-B-1 | 100 [GB] | 1000 [IOPS] | Block(FC) |
| Data4 | App1 | Disk2 | Block | Private1 | Grade1-1-B-1 | 100 [GB] | 1000 [IOPS] | Block(FC) |
| Data5 | App2 | Disk1 | Block | Public2 | Grade2-1-B-2 | 50 [GB] | 250 [IOPS] | Block |
| Data6 | App2 | Disk2 | Block | Public2 | Grade2-1-B-2 | 50 [GB] | 250 [IOPS] | Block |

DATA FLOW CONFIGURATION INFORMATION

| NODE ID | COUPLING DESTINATION NODE ID | RW TYPE | DATA PROTOCOL |
|---------|------------------------------|---------|---------------|
| VM1 | Data3 | RW | Block(FC) |
| VM1 | Data4 | RW | Block(FC) |
| VM2 | Data5 | RW | Block |
| VM2 | Data6 | RW | Block |

FIG. 6C

CONFIGURATION CHANGE ACTION MANAGEMENT TABLE 5003

| ACTION ID 6041 | CATEGORY 6042 | NAME 6043 | TARGET CLOUD 6044 | CHANGE TARGET 6045 | CANDIDATE PARAMETER 6046 |
|---|---|---|---|---|---|
| Action1 | GRADE CHANGE | GRADE CHANGE | Current | SERVICE | "SERVICE TYPE" IN MENU INFORMATION MANAGEMENT TABLE |
| Action2 | REDESIGN | CAPACITY REDESIGN | Public2 | CAPACITY | 1.0 TIME, 1.2 TIMES, 1.5 TIMES, AND 2.0 TIMES |
| Action3 | GRADE CHANGE | MIGRATION/ GRADE CHANGE | NonCurrent | SERVICE | "SERVICE TYPE" IN MENU INFORMATION MANAGEMENT TABLE |

FIG. 6D

CONFIGURATION CHANGE
POLICY MANAGEMENT TABLE 5005

| INDEX | ITEM | VALUE |
|---|---|---|
| IOPS | UPPER LIMIT VALUE OF IOPS USAGE RATE | 80% |

FIG. 6E

MONITORING INFORMATION
MANAGEMENT TABLE 5004

| NODE ID | TIME AND DATE | IOPS | SAVED DATA AMOUNT |
|---|---|---|---|
| Data4 | 2019-01-01 12:00:00 | ... | ... |
| | 2019-01-02 12:00:00 | ... | ... |
| | 2019-01-03 12:00:00 | ... | ... |
| | : | : | : |
| Data5 | 2019-01-01 12:00:00 | ... | ... |
| | 2019-01-02 12:00:00 | ... | ... |
| | 2019-01-03 12:00:00 | ... | ... |
| | : | : | : |
| Data6 | : | : | : |
| Data7 | : | : | : |

FIG. 6F

CONFIGURATION CHANGE CANDIDATE MANAGEMENT TABLE 5006

| RESOURCE | | CURRENT STATUS | | | | | | |
|---|---|---|---|---|---|---|---|---|
| AppID | STORAGE RESOURCE ID | CLOUD | SERVICE TYPE | CAPACITY | SAVED DATA AMOUNT | IOPS | IOPS USAGE RATE | COST |
| App1 | Data3 | Private1 | Grade1-1-B-1 | 100 [GB] | 50 [GB] | 1000 [IOPS] | 70 [%] | xxx [$] |
| App1 | Data4 | Private1 | Grade1-1-B-1 | 100 [GB] | 70 [GB] | 1000 [IOPS] | 70 [%] | xxx [$] |
| App2 | Data5 | Private1 | Grade1-1-B-2 | 50 [GB] | 40 [GB] | 100 [IOPS] | 90 [%] | xxx [$] |
| App2 | Data6 | Private1 | Grade1-1-B-2 | 50 [GB] | 35 [GB] | 100 [IOPS] | 90 [%] | xxx [$] |
| App3 | : | : | : | : | : | : | : | : |
| : | : | : | : | : | : | : | : | : |

| | ACTION | | | | ESTIMATION OF EFFECTS AFTER CHANGE | |
|---|---|---|---|---|---|---|
| ACTION TYPE | CLOUD AFTER CHANGE | SERVICE TYPE AFTER CHANGE | CAPACITY AFTER CHANGE | IOPS AFTER CHANGE | IOPS USAGE RATE AFTER CHANGE | COST AFTER CHANGE |
| - | - | - | - | - | - | - |
| - | - | - | - | - | - | - |
| MIGRATION AND GRADE CHANGE | Public2 | Grade2-1-B-2 | 50 [GB] | 250 [IOPS] | 36 [%] | xxx [$] |
| MIGRATION AND GRADE CHANGE | Public2 | Grade2-1-B-2 | 50 [GB] | 250 [IOPS] | 36 [%] | xxx [$] |
| : | : | : | : | : | : | : |
| : | : | : | : | : | : | : |
| : | : | : | : | : | : | : |

FIG. 6G

MENU INFORMATION MANAGEMENT TABLE 5001

| CLOUD 6001 | REGION 6002 | STORAGE SERVICE CATEGORY 6003 | SERVICE TYPE 6004 | UNIT PRICE 6005 | IOPS UNIT 6006 | MAXIMUM IOPS 6007 | VOLUME CAPACITY SPECIFICATION UNIT 6008 | MAXIMUM VOLUME CAPACITY 6009 |
|---|---|---|---|---|---|---|---|---|
| Private1 | Region1-1 | Block | Grade1-1-B-1 | xxx [$/ALLOCATED GB] | 1000 [IOPS/Vol] | 1000 [IOPS/Vol] | 1 [GB] | 2000 [GB] |
| Private1 | Region1-1 | Block | Grade1-1-B-2 | xxx [$/ALLOCATED GB] | 100 [IOPS/Vol] | 100 [IOPS/Vol] | 1 [GB] | 2000 [GB] |
| Public2 | Region2-1 | Block | Grade2-1-B-1 | xxx [$/ALLOCATED GB] | 10 [IOPS/GB] | 1000 [IOPS/Vol] | 1 [GB] | 2000 [GB] |
| Public2 | Region2-1 | Block | Grade2-1-B-2 | xxx [$/ALLOCATED GB] | 5 [IOPS/GB] | 500 [IOPS/Vol] | 1 [GB] | 2000 [GB] |
| Public2 | Region2-1 | File | Grade2-1-F-1 | xxx [$/USED GB] | - | - | - | - |
| Public2 | Region2-1 | Object | Grade2-1-O-1 | xxx [$/USED GB] | - | - | - | - |
| Public3 | Region3-1 | Block | Grade3-1-B-1 | xxx [$/Vol] | 500 [IOPS/Vol] | 500 [IOPS/Vol] | 1000 [GB] | 1000 [GB] |
| Public3 | Region3-1 | Block | Grade3-1-B-2 | xxx [$/Vol] | 500 [IOPS/Vol] | 500 [IOPS/Vol] | 100 [GB] | 100 [GB] |
| Public3 | Region3-1 | File | Grade3-1-F-1 | xxx [$/USED GB] | - | - | - | - |
| Public3 | Region3-1 | Object | Grade3-1-O-1 | xxx [$/USED GB] | - | - | - | - |

FIG. 10A

CONFIGURATION INFORMATION MANAGEMENT TABLE (BEFORE CONFIGURATION CHANGE) 5002

COMPUTING RESOURCE CONFIGURATION INFORMATION

| NODE ID | NODE TYPE | GROUP ID | ROLE | CLOUD | END POINT |
|---|---|---|---|---|---|
| VM4 | VM | App1 | App | Private1 | x.x.x.x |
| VM5 | VM | App1 | NAS | Private1 | x.x.x.x |
| VM6 | VM | App1 | Backup | Private1 | x.x.x.x |

STORAGE RESOURCE CONFIGURATION INFORMATION

| NODE ID | GROUP ID | ROLE | CATEGORY | CLOUD | SERVICE TYPE | CAPACITY | PERFORMANCE | DATA PROTOCOL |
|---|---|---|---|---|---|---|---|---|
| Data7 | App1 | Primary | Block | Private1 | Grade1-1-B-1 | 100 [GB] | 1000 [IOPS] | Block(FC) |
| Data8 | App1 | Secondary | Block | Private1 | Grade1-1-B-2 | 100 [GB] | 1000 [IOPS] | Block(FC) |

DATA FLOW CONFIGURATION INFORMATION

| NODE ID | COUPLING DESTINATION NODE ID | RW TYPE | DATA PROTOCOL |
|---|---|---|---|
| VM4 | VM5 | RW | File(NFS) |
| VM5 | Data7 | RW | Block(FC) |
| VM6 | Data7 | R | Block(FC) |
| VM7 | Data8 | W | Block(FC) |

FIG. 10B

CONFIGURATION INFORMATION MANAGEMENT TABLE (AFTER CONFIGURATION CHANGE) 5002

COMPUTING RESOURCE CONFIGURATION INFORMATION

| NODE ID | NODE TYPE | GROUP ID | ROLE | CLOUD | END POINT |
|---|---|---|---|---|---|
| VM4 | VM | App1 | App | Private1 | x.x.x.x |
| VM5 | VM | App1 | NAS | Private1 | x.x.x.x |
| VM6 | VM | App1 | Backup | Private1 | x.x.x.x |

STORAGE RESOURCE CONFIGURATION INFORMATION

| NODE ID | GROUP ID | ROLE | CATEGORY | CLOUD | SERVICE TYPE | CAPACITY | PERFORMANCE | DATA PROTOCOL |
|---|---|---|---|---|---|---|---|---|
| Data7 | App1 | Primary | Block | Private1 | Grade1-1-B-1 | 100 [GB] | 1000 [IOPS] | Block(FC) |
| Data8 | App1 | Secondary | Object | Public2 | Grade2-1-O-1 | - | - | Object(Public2) |

DATA FLOW CONFIGURATION INFORMATION

| NODE ID | COUPLING DESTINATION NODE ID | RW TYPE | DATA PROTOCOL |
|---|---|---|---|
| VM4 | VM5 | RW | File(NFS) |
| VM5 | Data7 | RW | Block(FC) |
| VM6 | Data7 | R | Block(FC) |
| VM7 | Data8 | W | Object(Public2) |

FIG. 10C

COMPONENT ASSOCIATED STORAGE MANAGEMENT TABLE 9001

| ROLE | FRONT END | | BACK END | |
|---|---|---|---|---|
| | CLOUD | DATA PROTOCOL | CLOUD | DATA PROTOCOL |
| NAS | Private1 | File | — | Block |
| | | | Public2 | Object |
| Backup | Private1 | Block, File | — | Block |
| | | | | File |
| | | | Public2 | Object |
| Gateway | Private1 | Block, File | Public3 | Object |
| | | | Public2 | Object |

FIG. 10D

CONFIGURATION CHANGE
ACTION MANAGEMENT TABLE 5003

| ACTION ID 6041 | CATEGORY 6042 | NAME 6043 | TARGET CLOUD 6044 | CHANGE TARGET 6045 | CANDIDATE PARAMETER 6046 |
|---|---|---|---|---|---|
| Action1 | GRADE CHANGE | GRADE CHANGE | Current | SERVICE | "SERVICE TYPE" IN MENU INFORMATION MANAGEMENT TABLE |
| Action2 | REDESIGN | CAPACITY REDESIGN | Public2 | CAPACITY | 1.0 TIME, 1.2 TIMES, 1.5 TIMES, AND 2.0 TIMES |
| Action3 | GRADE CHANGE | MIGRATION/ GRADE CHANGE | NonCurrent | SERVICE | "SERVICE TYPE" IN MENU INFORMATION MANAGEMENT TABLE |
| Action4 | SETTING CHANGE | SETTING CHANGE | Current | SETTING IN NODE | COMPONENT-STORAGE CORRESPONDENCE MANAGEMENT TABLE |

FIG. 10E

CONFIGURATION CHANGE CANDIDATE MANAGEMENT TABLE 5006

| | RESOURCE | | | CURRENT STATUS | | | | | |
|---|---|---|---|---|---|---|---|---|---|
| AppID | STORAGE RESOURCE ID | CLOUD | SERVICE TYPE | CAPACITY | SAVED DATA AMOUNT | IOPS | IOPS USAGE RATE | COST | |
| App1 | ... | ... | ... | ... | ... | ... | ... | ... | |
| App2 | ... | ... | ... | ... | ... | ... | ... | ... | |
| App3 | Data7 | Private1 | Grade1-1-B-1 | 50 [GB] | 40 [GB] | 1000 [IOPS] | 50 [%] | xxx [$] | |
| | Data8 | Private1 | Grade1-1-B-2 | 50 [GB] | 35 [GB] | 100 [IOPS] | 50 [%] | xxx [$] | |
| ... | ... | ... | ... | ... | ... | ... | ... | ... | |

| | ACTION | | | | | ESTIMATION OF EFFECTS AFTER CHANGE | |
|---|---|---|---|---|---|---|---|
| ACTION TYPE | CLOUD AFTER CHANGE | SERVICE TYPE AFTER CHANGE | CAPACITY AFTER CHANGE | IOPS AFTER CHANGE | IOPS USAGE RATE AFTER CHANGE | COST AFTER CHANGE | |
| ... | ... | ... | ... | ... | ... | ... | |
| ... | ... | ... | ... | ... | ... | ... | |
| - | - | - | - | - | - | - | |
| SETTING CHANGE | Public2 | Grade2-1-O-1 | - [GB] | - [IOPS] | - [%] | xxx [$] | |
| ... | ... | ... | ... | ... | ... | ... | |

FIG. 10F

CONFIGURATION CHANGE HISTORY MANAGEMENT TABLE 1301

| CHANGE ID 1401 | REFERENCE TO MONITORING INFORMATION 1402 | APPLICATION TYPE 1403 | STORAGE CATEGORY AFTER CHANGE 1404 | STORAGE AFTER CHANGE 1405 |
|---|---|---|---|---|
| CHANGE 1 | MonitoringData1 | ANALYSIS | OBJECT | Grade2-1-O-1 |
| CHANGE 2 | MonitoringData2 | DB | NO CHANGE IS EXECUTED | - |
| CHANGE 3 | MonitoringData3 | Log | OBJECT | Grade2-1-O-1 |
| CHANGE 4 | MonitoringData4 | NoSQL | FILE | Grade2-1-F-1 |

FIG. 14A

MONITORING INFORMATION MANAGEMENT TABLE 5004

| MONITORING INFORMATION ID | TIME AND DATE | IOPS | SAVED DATA AMOUNT | Read DATA AMOUNT | Write DATA AMOUNT | ... |
|---|---|---|---|---|---|---|
| MonitoringData1 | 2019-01-01 12:00:00 | ... | ... | ... | ... | ... |
| | 2019-01-02 12:00:00 | ... | ... | ... | ... | ... |
| | 2019-01-03 12:00:00 | : | : | : | : | : |
| MonitoringData2 | : | : | : | : | : | : |

CLOUD USAGE ASSISTING APPARATUS AND CLOUD USAGE ASSISTING METHOD

CROSS-REFERENCE TO RELATED APPLICATION

This application claims priority pursuant to 35 U.S.C. § 119 from Japanese Patent Application No. 2019-100886, filed on May 30, 2019, the entire disclosure of which is incorporated herein by reference.

BACKGROUND

Technical Field

The present invention relates to a cloud usage assisting apparatus and a cloud usage assisting method.

Related Art

U.S. Patent Application Publication No. 2013/0339419 describes a technique of managing a private cloud and a public cloud. The aforementioned technique describes a method in which an application and data to be migrated between the public cloud and the private cloud are determined based on a load change tendency, a resource consumption increase tendency, and a remaining period of the application to optimize the usage rate of the private cloud while using the public cloud.

SUMMARY

In recent years, the public cloud has become widespread. In the public cloud, a user uses logical IT resources taken out of the IT assets owned by a cloud provider (cloud service provider) as an on-demand service, instead of owning the IT resources as his/her own IT assets. The public cloud can be referred to as a pay-as-you-go type cloud usage mode in which the user pays the charge according to the amount of usage.

Meanwhile, many companies have been using the private cloud using IT assets dedicated to themselves. The private cloud has the following advantages: since the user exclusively uses the IT assets owned by his/her company, the performance stability is ensured; and the cost can be easily estimated. However, the private cloud has risks that the unused IT resources directly become loss and additional IT resources cannot be immediately used in the case of IT resource shortage. Accordingly, in recent years, a hybrid cloud is anticipated as an application mode of the cloud. In the hybrid cloud, the private cloud and the public cloud are used while being allocated for the right jobs depending on the characteristics of workload and the like of each work application.

Options of the cloud usage configuration need to be compared from various viewpoints to select an optimal cloud usage configuration in the use of the aforementioned hybrid cloud. For example, when a configuration change (migration or the like) is to be performed for the operating IT resources, it is necessary to analyze a load status and a resource consumption amount by using monitoring information, to calculate performance, cost, impact of the configuration change, and the like in the case where the configuration is changed such that clouds including clouds other than the used clouds are operated, based on future estimation values relating to consumption of the load and resources, and to compare candidate configuration change plans.

In recent years, as more and more functions are provided by clouds, IT resources provided as services are becoming more diverse and the difficulty of the aforementioned comparison is increasing. For example, the types of storages provided by the clouds include block storage, file storage, object storage, and the like. In the aforementioned comparison, it is necessary to consider various aspects such as specification characteristics which are characteristics relating to a capacity value and a performance value such as IOPS, cost characteristics which are characteristics relating to cost such as type and unit of charge, and coupling characteristics which are characteristics relating to a coupling mode such as an interface (protocol) used in the case of using each type of cloud service. U.S. Patent Application Publication No. 2013/0339419 does not describe at all determining the optimal cloud usage configuration while considering various characteristics of the IT resources provided by the clouds.

The present invention has been made in view of such backgrounds and an object thereof is to provide a cloud usage assisting apparatus and a cloud usage assisting method which assist determination of an optimal cloud usage configuration.

One aspect of the present invention for achieving the aforementioned object is a cloud usage assisting apparatus comprising a processor, a memory, a storage unit configured to store menu information including information on a plurality of menus for a service using storage resources provided by one or more clouds, the menus varying in at least one of performance and cost of the service, storage resource configuration information which is information on configurations of the storage resources, monitoring information including history information on performances of the storage resources, and configuration change action information which is information on actions of configuration changes executable on the storage resources, and a configuration change action candidate determination part configured to calculate changes in the performance and the cost of the service which are to occur when each of the actions is executed and the configuration change is made, based on the menu information, the storage resource configuration information, and the monitoring information, each of the actions being an action in which at least one of the configuration changes of changing of the menu involving one of the clouds, changing of the menu involving the different clouds, and changing of a parameter that changes the configurations of the storage resources in the menu is executed on the storage resources, and determine the action as a recommended candidate when the action improves at least one of the performance and the cost.

Other problems and methods for solving the problems disclosed in this application will be made clear in the section of the embodiments of the invention and the drawings.

The present invention can assist determination of an optimal cloud usage configuration.

BRIEF DESCRIPTION OF THE DRAWINGS

FIG. 4A is an example of menus of a cloud service;
FIG. 4B is an example of the menus of the cloud service;
FIG. 4C is an example of the menus of the cloud service;
FIG. 4D is an example of the menus of the cloud service;
FIG. 6A is an example of a menu information management table;
FIG. 6B is an example of a configuration information management table;
FIG. 6C is an example of a configuration information management table;
FIG. 6D is an example of a configuration change action management table;
FIG. 6E is an example of a configuration change policy management table;
FIG. 6F is an example of a monitoring information management table;
FIG. 6G is an example of a configuration change candidate management table;
FIG. 10A is an example of a menu information management table in the second embodiment;
FIG. 10B is an example of a configuration information management table in the second embodiment;
FIG. 10C is an example of a configuration information management table in the second embodiment;
FIG. 10D is an example of a component associated storage management table;
FIG. 10E is an example of a configuration change action management table in the second embodiment;
FIG. 10F is an example of a configuration change candidate management table in the second embodiment;
FIG. 14A is an example of a configuration change history management table;
and
FIG. 14B is an example of a monitoring information management table.

DETAILED DESCRIPTION OF EMBODIMENTS

Figure 1:
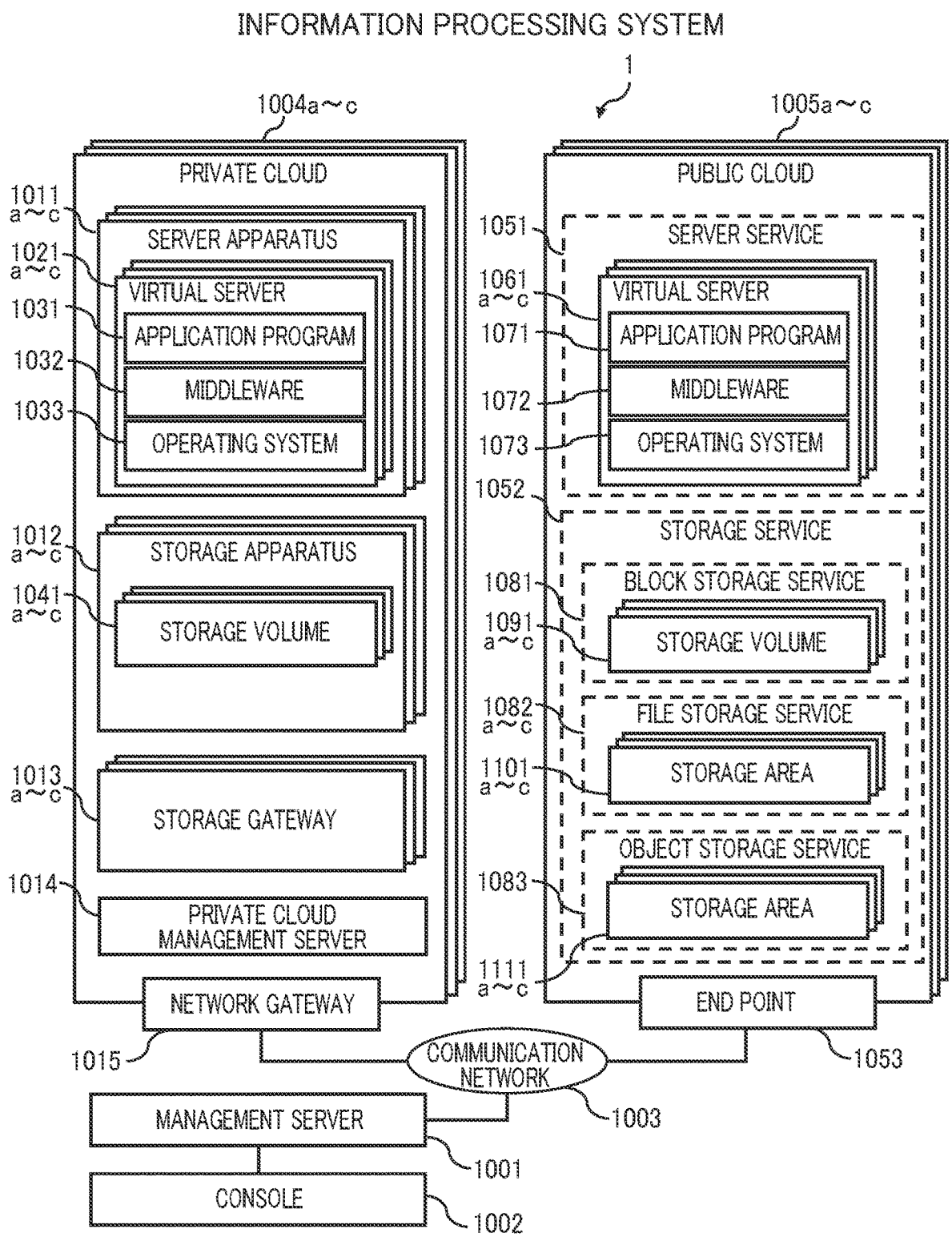
FIG. 1 is a view for explaining a schematic configuration of an information processing system.

Embodiments of the present invention are described below with reference to the drawings. In the following description, the same or similar configurations are denoted by common reference numerals and overlapping description thereof is omitted in some cases.
<Explanation of Terms>
First, terms used in the embodiments are explained.
IT assets refers to assets such as server apparatuses and storage apparatuses which provide IT resources.

Computing resources refers to resources relating to computation among logical IT resources taken out of the IT assets of a cloud. Examples of the computing resources include a virtual machine.

Storage resources refers to resources relating to saving of data among the logical IT resources taken out of the IT assets of a cloud. Examples of the storage resources include a storage volume of a block storage, a storage area provided by a file storage service, a storage area provided by an object storage service, and the like.

A public cloud refers to an IT asset usage mode in which a user does not own IT resources necessary for computation processing and saving (storage) of data as his/her own assets and, instead, uses logical IT resources taken out of IT assets owned by a provider of cloud such as a cloud service provider as an on-demand service.

A private cloud refers to an IT asset usage mode in which a user owns his/her own IT assets such as server apparatuses and storage apparatuses and efficiently uses IT resources by using a cloud technology.

An application is a certain business system and refers to a collection of computing resources and storage resources forming the certain business system. Note that, although the term "application" generally refers to a single software program which operates based on an operating system and middleware, such a software program is referred to as application program in the embodiment.

First Embodiment

FIG. 1 illustrates a schematic configuration of an information processing system 1 described as a first embodiment. As illustrated in FIG. 1, the information processing system 1 includes a management server 1001 (cloud usage assisting apparatus), a console 1002, a communication network 1003, private clouds 1004a to 1004c, and public clouds 1005a to 1005c.

The management server 1001 manages configurations and operating statuses of storage resources created in the clouds. Moreover, the management server 1001 determines an action of configuration change (hereafter, referred to as "configuration change action") to be recommended to a user and presents the determined configuration change action to the user.

The console 1002 is a user interface on which information (data) is inputted into and outputted from the management server 1001.

The communication network 1003 couples the management server 1001, the private clouds 1004a to 1004c, and the public clouds 1005a to 1005c to one another such that they can perform bidirectional communication. The communication network 1003 is wireless or wired communication means and is, for example, a local area network (LAN), a wide area network (WAN), the Internet, various public communication networks, a leased line, or the like.

The private clouds 1004a to 1004c are instances of the private clouds.

The public clouds 1005a to 1005c are instances of the public clouds.

As illustrated in FIG. 1, the private clouds 1004a to 1004c each include server apparatuses 1011a to 1011c, storage apparatuses 1012a to 1012c, storage gateways 1013a to 1013c, a private cloud management server 1014, and a network gateway 1015.

Among these, the server apparatuses 1011a to 1011c are information processing apparatuses which provide computing capability (calculation (operation) capability). The server apparatuses 1011a to 1011c may be used in units of virtual servers 1021a to 1021c. An operating system 1033, middleware 1032, an application program 1031, and the like are installed in each of the virtual servers 1021a to 1021c as necessary.

The storage apparatuses 1012a to 1012c are apparatuses which provide data saving capability (storage capability). The storage apparatuses 1012a to 1012c may be used in units of storage volumes 1041a to 1041c. When the storage apparatuses 1012a to 1012c are block storages, the storage volumes 1041a to 1041c receive and output data as block storages.

The storage gateways 1013a to 1013c are storages of a different type from the storage apparatuses 1012a to 1012c and are storages which exchange data with the public clouds. Although the storage gateways 1013a to 1013c provide block-type interfaces to the user or the server apparatuses 1011a to 1011c as in a conventional storage, the data exchanged via these interfaces is actually handled as data exchanged with the public clouds. Specifically, the user can use the public clouds through the same interface as the conventional storage, by exchanging the data via the storage gateways 1013a to 1013c.

The private cloud management server 1014 manages the IT assets and the IT resources of the private cloud. The private cloud management server 1014 manages information (hereafter, referred to as "configuration information") on configurations of the IT resources (virtual servers 1021a to 1021c, storage volumes 1041a to 1041c, and the like) based on the IT assets (server apparatuses 1011a to 1011c, storage apparatuses 1012a to 1012c, and the like) and performs measurement and management for information (hereafter, referred to as "monitoring information") on recorded values (history) of the IT resources such as performance values.

The network gateway 1015 in each of the private clouds 1004a to 1004c couples the corresponding private cloud to the communication network 1003.

The public clouds 1005a to 1005c each provide a server service 1051 and a storage service 1052.

Among these, the server service 1051 is a service which provides the computing resources. The computing resources provided by the server service 1051 include virtual servers 1061a to 1061c. As in the private clouds, an operating system 1073, middleware 1072, an application program 1071, and the like are installed in each of the virtual servers 1061a to 1061c as necessary.

The storage service 1052 is a service which provides the storage resources. The storage resources provided by the storage service 1052 include storage volumes 1091a to 1091c provided by a block storage service 1081, storage areas 1101a to 1101c provided by a file storage service 1082, and storage areas 1111a to 1111c provided by an object storage service 1083.

An end point 1053 in each of the public clouds 1005a to 1005c is an interface for using and managing various services provided by the corresponding public cloud. Users of the cloud services use and delete the computing resources and the storage resources and obtain the configuration information and the monitoring information via a web application programming interface (Web API) or the like provided by the end point 1053.

Figure 2:
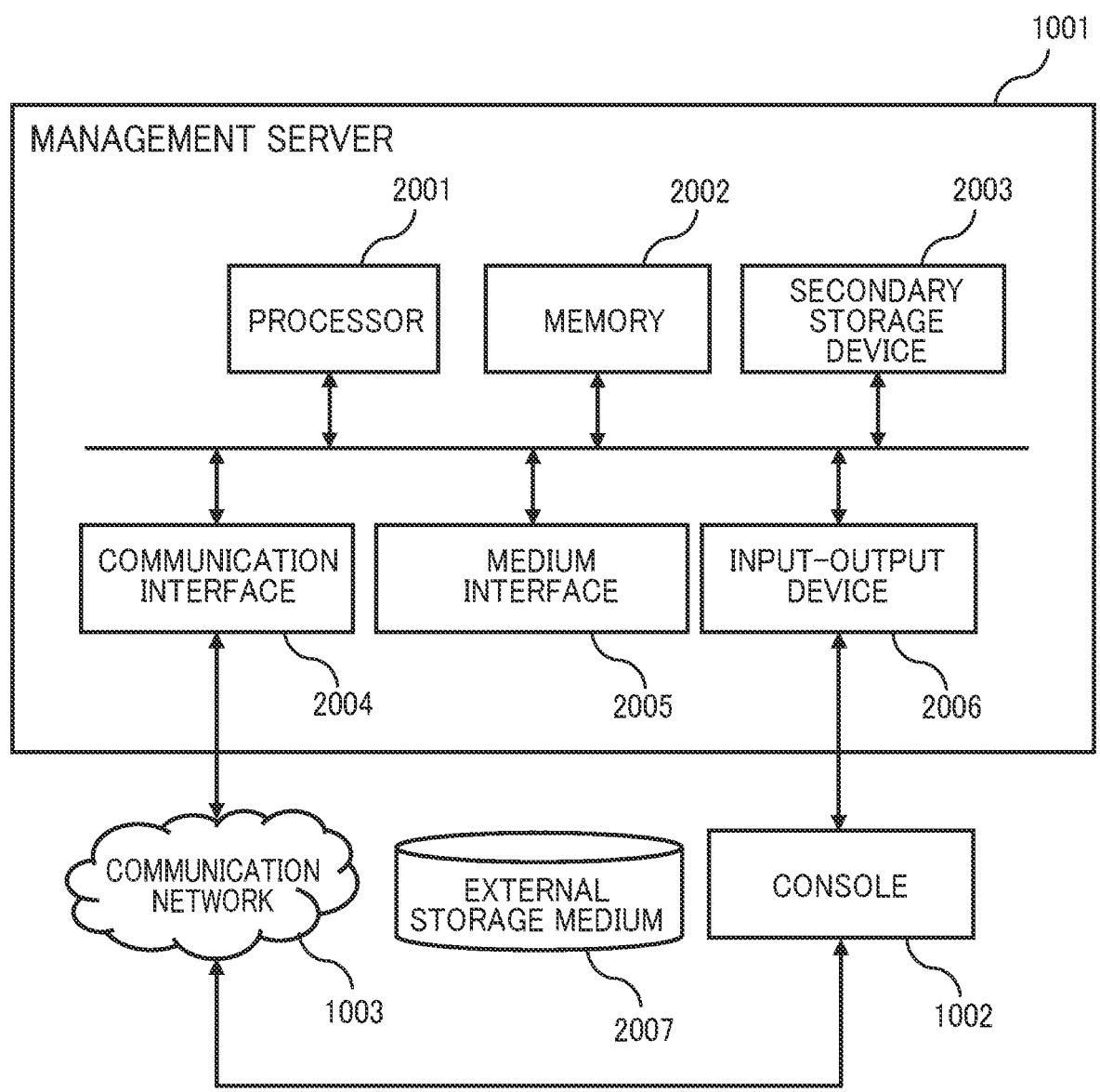
FIG. 2 is a hardware configuration example of a management server.

FIG. 2 illustrates an example of a hardware configuration of the management server 1001. The management server 1001 given as an example includes a processor 2001 (central processing unit (CPU), micro processing unit (MPU), artificial intelligence (AI) chip, or the like), a memory 2002, and a secondary storage device 2003. Functions provided by the management server 1001 are implemented by causing the processor 2001 to load programs stored in the secondary storage device 2003 onto the memory 2002 and execute the programs. The programs may be stored in the secondary storage device 2003 in advance, obtained from other apparatuses via a communication interface 2004 as necessary, or obtained by being read from a medium usable via a medium interface 2005. The aforementioned medium is, for example, a communication medium (specifically, a communication network such as wired, wireless, or optical communication network or a carrier wave or a digital signal propagating through this communication network) or an external storage medium 2007 detachably coupled to the medium interface 2005. Note that the console 1002 used to operate the management server 1001 may be coupled to the management server 1001 via an input-output device 2006.

The aforementioned configurations, functions, and the like may be entirely or partially implemented by hardware by, for example, designing an integrated circuit (field programmable gate array (FPGA), application specific integrated circuit (ASIC), or the like). Moreover, the aforementioned configurations, functions, and the like may be implemented by software by causing a processor to interpret and execute programs which implement the functions. Information such as programs, tables, files and the like which implement the functions can be recorded in the memory 2002, the secondary storage device 2003 such as a hard disk drive and a solid state drive (SSD), a memory card such as an integrated circuit (IC) card and a secure digital (SD) memory card, or a recording medium such as a digital versatile disc (DVD). Moreover, the aforementioned configurations may be entirely or partially implemented as virtual hardware (virtual machine).

<Specific Examples of Configuration Change>

Next, description is given of examples of an inter-cloud configuration change involving the storage resources.

Figure 3A:
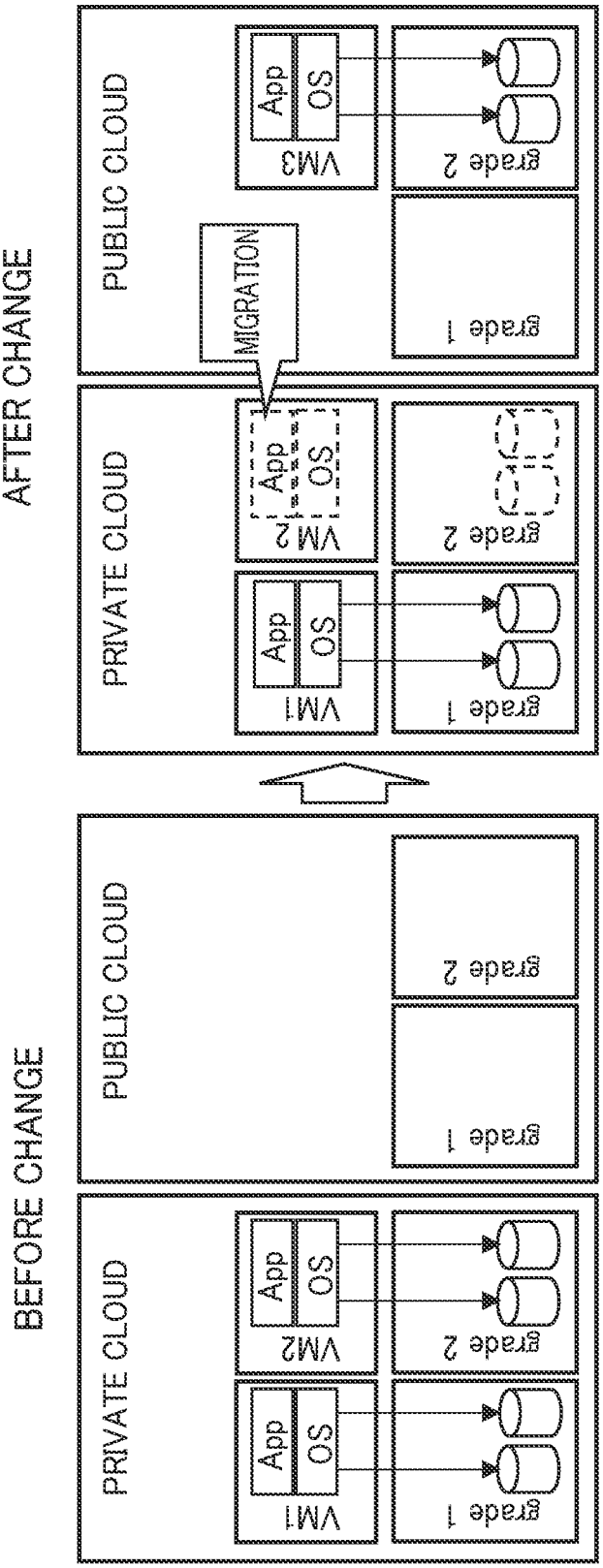
FIG. 3A is an example of a configuration change.

FIG. 3A is an example of an inter-cloud configuration change involving the block storages. As illustrated in FIG. 3A, storages used by a virtual machine VM1 and a virtual machine VM2 are in a private cloud before the change. In the configuration change given as an example, the virtual machine VM2 is migrated to a public cloud on the application-to-application basis and storage resources used by the virtual machine VM2 are also migrated to the public cloud.

Figure 3B:
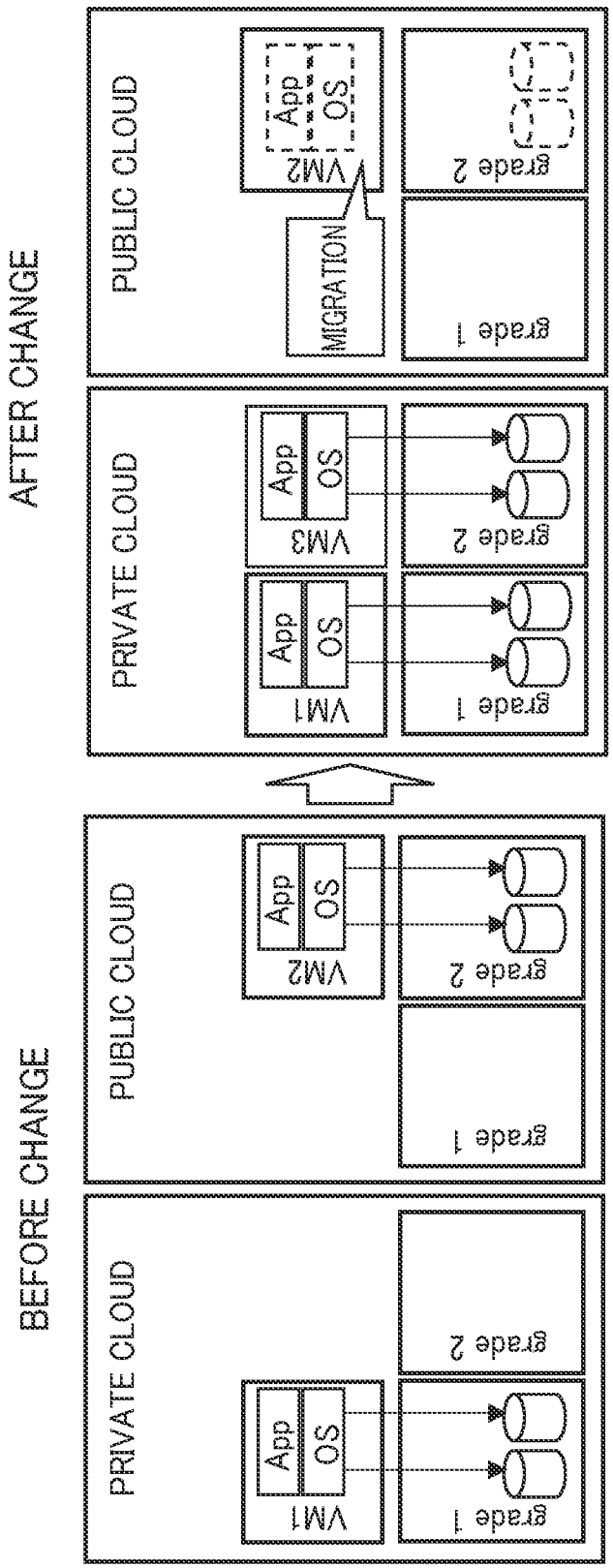
FIG. 3B is an example of the configuration change.

FIG. 3B is an example of the inter-cloud configuration change involving the block storages. As illustrated in FIG. 3B, storages used by a virtual machine VM1 are in a private cloud and storages used by a virtual machine VM2 are in a public cloud before the change. In the configuration change given as an example, the virtual machine VM2 is migrated to the private cloud on the application-to-application basis and storage resources used by the virtual machine VM2 are also migrated to the private cloud.

Figure 3C:
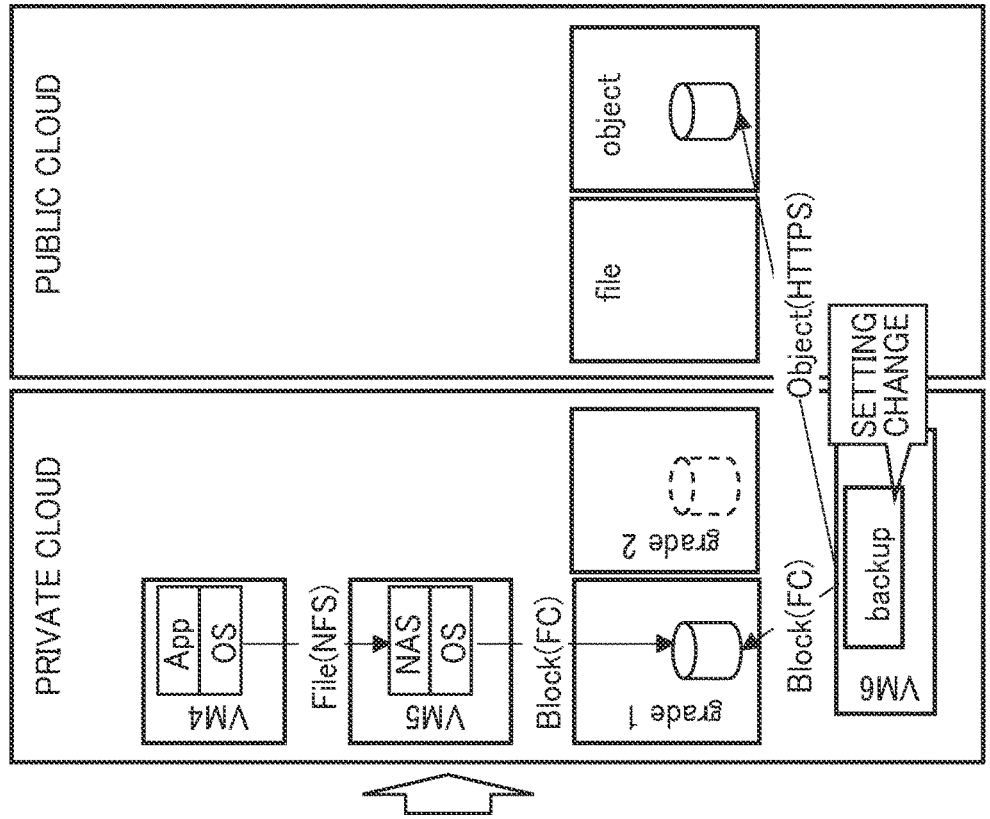
FIG. 3C is an example of the configuration change.
Figure 3C:
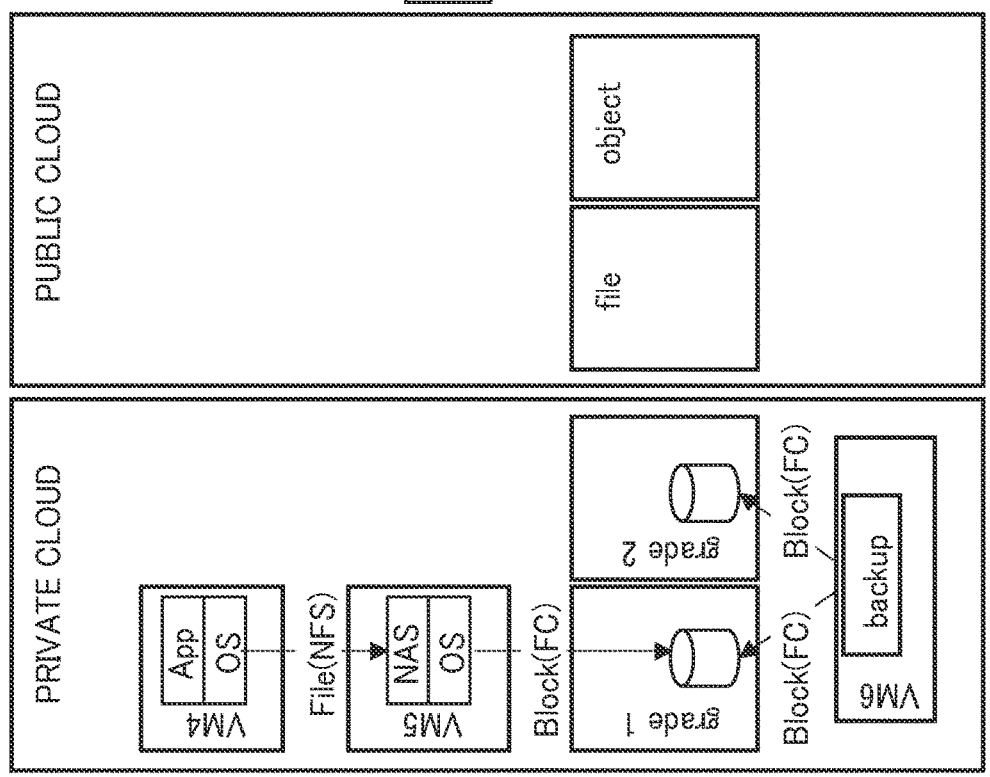

FIG. 3C is an example of an inter-cloud configuration change involving different types of storage resources. Before the change, a private cloud includes a virtual machine VM4 which runs an application program, a virtual machine VM5 which runs a network attached storage (NAS) server, and a virtual machine VM6 which runs a backup server. The virtual machine VM6 which runs the backup server performs backup by copying a storage resource used by the virtual machine VM5 to another storage resource. In the configuration change given as an example, before the change, files are accessed from the virtual machine VM4 through a protocol such as Network File System (NFS) (registered trademark) and blocks are accessed from the virtual machine VM5 and the virtual machine VM6 through a protocol such as Fibre Channel (FC).

In the configuration change given as an example, before the configuration change, a destination of the backup performed by the backup server is set to a block storage using FC. However, after the configuration change, setting is changed such that the backup destination is set to an object storage in a public cloud using Web API on a hypertext transfer protocol secure (HTTPS). Note that a data input-output interface is changed with the aforementioned setting change. Specifically, this example is based on the assumption that the backup server in the virtual machine VM6 is capable of using the object storage in the public cloud. Since this configuration change is a configuration change for a storage resource which is not directly referred to by the application program running in the virtual machine VM4, transparency from the viewpoint of the application program is relatively high.

Figure 3D:
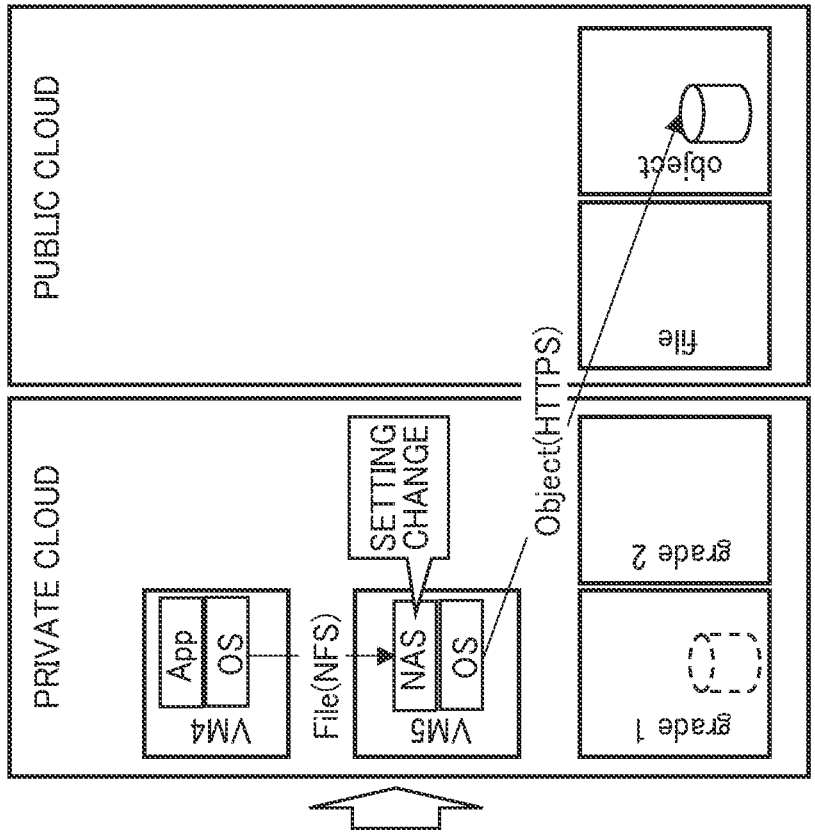
FIG. 3D is an example of the configuration change.
Figure 3D:
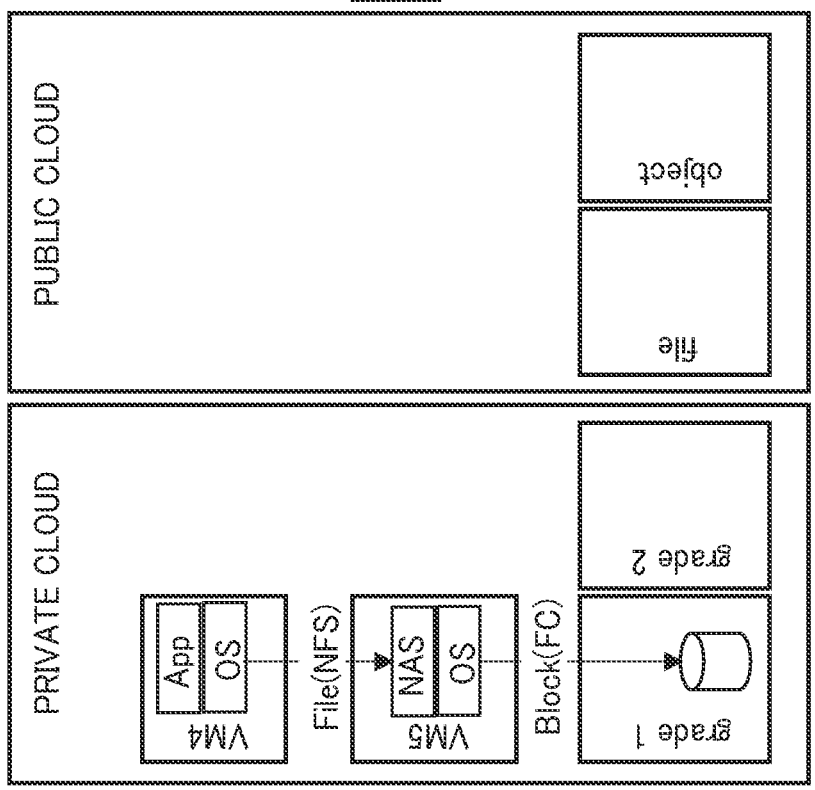

FIG. 3D is an example of the inter-cloud configuration change involving different types of storages. As illustrated in FIG. 3D, before the configuration change, a private cloud includes a virtual machine VM4 which runs an application program and a virtual machine VM5 which runs a NAS server. In the configuration change given as an example, a storage used by the NAS server is changed from a block storage in the private cloud to an object storage in a public cloud. Note that this example is based on the assumption that the NAS server to be changed is capable of using the object storage in the public cloud, and a data input-output interface is changed with the setting change.

Figure 3E:
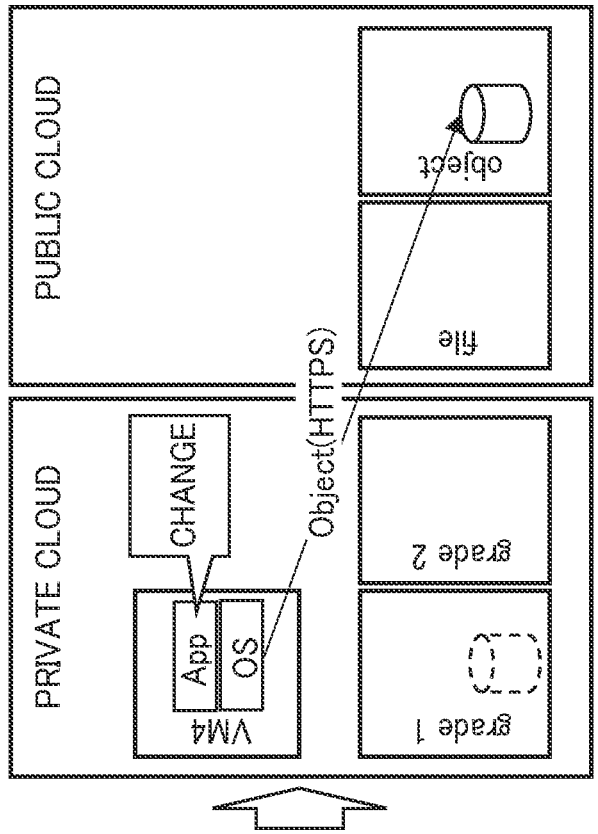
FIG. 3E is an example of the configuration change.
Figure 3E:
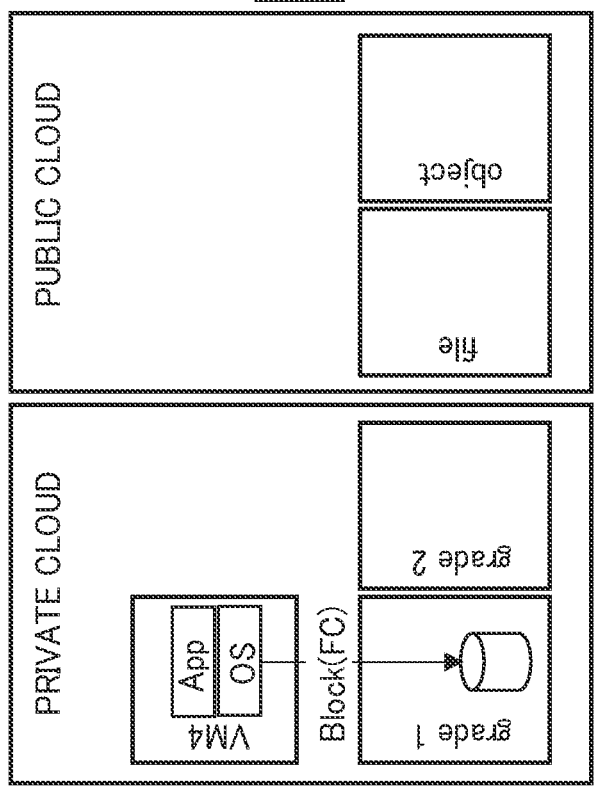

FIG. 3E is an example of the inter-cloud configuration change involving different types of storages. As illustrated in FIG. 3E, before the configuration change, a private cloud includes the virtual machine VM4 which runs an application program. In the configuration change given as an example, data input-output destination of the application program running in the virtual machine VM4 is changed from a block storage in the private cloud to an object storage in a public cloud. This configuration change requires changing of the application program (for example, changing of a source code) and cost of the change may be relatively high from the viewpoint of the application program.

<Service Menu>

Contents of each of menus of cloud services provided to a user of the cloud are set in consideration of specification characteristics, cost characteristics, and coupling characteristics of the IT resources provided by the cloud.

For example, when the cloud service is a storage service which provides storages, the aforementioned specification characteristics include characteristics relating to a capacity value and performance values such as IOPS of the IT resources used by the cloud service user. For example, the specification characteristics are characteristics such as: the IOPS and the capacity to be allocated are fixed; and the IOPS varies depending on the capacity to be allocated.

Moreover, the aforementioned cost characteristics are characteristics relating to, for example, types and units of charging. For example, the cost characteristics are characteristics such as: charging varies depending on a capacity (GB) to be allocated which is specified by the user; the capacity (GB) to be allocated is fixed in the menu and unable to be specified by the user and the charge for use is also fixed.

Moreover, the aforementioned coupling characteristics are characteristics relating to, for example, an interface (protocol) used in the case of using the cloud service. For example, in the object storage which is often provided by the public cloud, data is often saved and obtained in the unit of object through the Web API (Application Programming Interface), unlike in the conventional block or file interface. Moreover, the mode of coupling between the private cloud and the public cloud has become diverse. Among appliances called storage gateways arranged in the private clouds, there have appeared appliances which display the interface of the block storage to the user while performing data input and output by using the object storage in the public cloud as an actual data storage.

FIGS. 4A to 4D illustrate examples of menus of storage services set in consideration of the aforementioned characteristics.

FIG. 4A is an example of menus for the block storage. As illustrated in FIG. 4A, two different types of menus varying in the IOPS performance are prepared in this example. In each menu, the unit price is proportional to the allocated capacity (parameter which changes the configuration of the storage resource) of the volume and the IOPS is fixed irrespective of the allocated capacity. The user specifies one of the menus and the allocated capacity to use the block storage.

FIG. 4B is another example of menus for the block storage. As illustrated in FIG. 4B, two different types of menus varying in the IOPS performance are prepared in this example. In each menu, the unit price is proportional to the allocated capacity of the volume as in FIG. 4A. However, FIG. 4B is different from FIG. 4A in that the IOPS is also proportional to the allocated capacity. The user specifies one of the menus and the allocated capacity to use the block storage.

FIG. 4C is another example of menus for the block storage. As illustrated in FIG. 4C, two different types of menus varying in the volume capacity are prepared in this example. In each menu, since the allocated capacity of the volume and the IOPS are defined in advance, the user does not specify these parameters. Moreover, the unit price and the IOPS are already defined in the unit of volume (unit of menu). In this example, the user specifies one of the menus to use the block storage.

FIG. 4D is an example of menus for types of storages different from the block storage. In this example, a menu for a file storage service and a menu for an object storage service are prepared. In each menu, the unit price is proportional to a used data amount instead of the allocated capacity. A performance value of each menu is displayed as throughput. The user specifies one of the menus to use the file storage service or the object storage service.

<Management Server (Cloud Usage Assisting Apparatus)>

Figure 5:
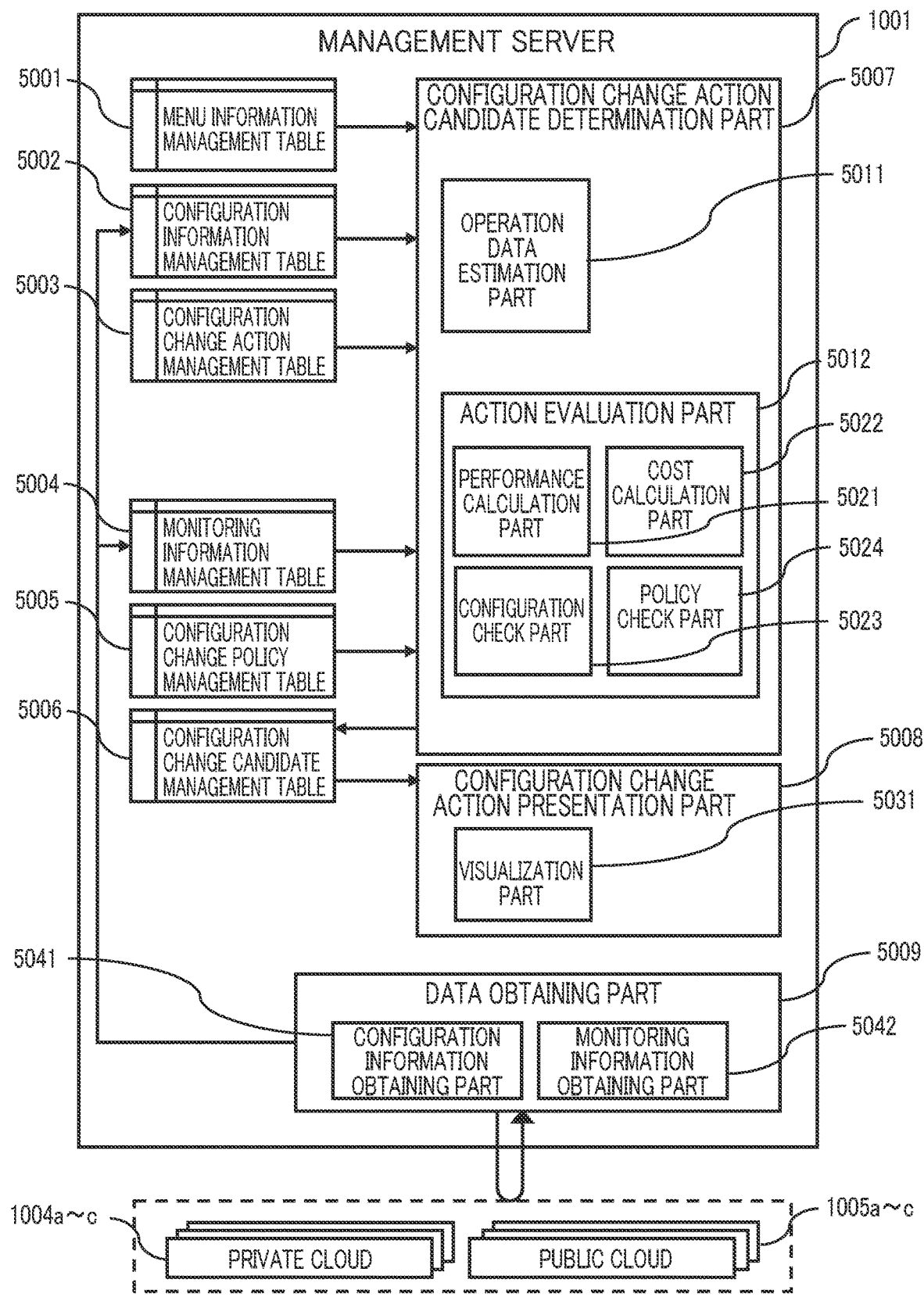
FIG. 5 is a view illustrating main functions of the management server and main data stored in the management server.

FIG. 5 illustrates main functions of the management server 1001 and main data stored in the management server 1001.

As illustrated in FIG. 5, the management server 1001 stores a menu information management table 5001, a configuration information management table 5002, a configuration change action management table 5003, a monitoring information management table 5004, a configuration change policy management table 5005, and a configuration change candidate management table 5006.

Information on the menus to be provided to the users of the clouds (private clouds 1004a 1004c, public clouds 1005a to 1005c) is managed in the menu information management table 5001.

Configuration information on the storage resources (computing resource, storage resources) created by the clouds is managed in the configuration information management table 5002. The contents of the configuration information management table 5002 are obtained from the private cloud management server 1014 for each of the private clouds 1004a to 1004c and from the end point 1053 for each of the public clouds 1005a to 1005c.

Information on the configuration change actions which can be performed on the operating IT resources is managed in the configuration change action management table 5003.

Monitoring information on the performances of the operating IT resources is managed in the monitoring information management table 5004. For example, the contents of the monitoring information management table 5004 are obtained from the private cloud management server 1014 for each of the private clouds 1004a to 1004c and from the end point 1053 for each of the public clouds 1005a to 1005c.

Information (hereafter, referred to as "policy information") on policies such as limiting conditions in the execution of the configuration change actions is managed in the configuration change policy management table 5005.

Information on candidates (hereafter, referred to as "configuration change action candidates") of the actions of configuration changes by which an improvement is expected is managed in the configuration change candidate management table 5006.

As illustrated in FIG. 5, the management server 1001 includes functions of a configuration change action candidate determination part 5007, a configuration change action presentation part 5008, and a data obtaining part 5009. Note that the management server 1001 may include, in addition to the aforementioned configuration, for example, functions such as an operation system, a device driver, a file system, and a database management system (DBMS).

The configuration change action candidate determination part 5007 determines configuration change action candidates. The configuration change action candidate determination part 5007 includes functions of an operation data estimation part 5011 and an action evaluation part 5012.

Among these, the operation data estimation part 5011 analyzes the monitoring information in the monitoring information management table 5004 to estimate future operation statuses of the IT resources.

The action evaluation part 5012 evaluates effects of performing an action of configuration change (hereafter, referred to as "configuration change action") on the operating IT resources. As illustrated in FIG. 5, the action evaluation part 5012 includes functions of a performance calculation part 5021, a cost calculation part 5022, a configuration check part 5023, and a policy check part 5024.

Among these, the performance calculation part 5021 calculates changes in the performance values such as IOPS in the case where each configuration change action is performed. The cost calculation part 5022 calculates a change in cost when each configuration change action is performed. The configuration check part 5023 checks the configuration when each configuration change action is performed. As an example of the aforementioned configuration check, when an action of increasing the capacity is applied, the configuration check part 5023 checks whether the capacity exceeds an upper limit of capacity defined in the cloud menu. The policy check part 5024 checks the policy when each configuration change action is performed. As an example of the policy check, when the action of changing the menu is applied, the policy check part 5024 checks whether the performance value falls within a certain range (range defined in advance as the policy).

The configuration change action presentation part 5008 presents (displays) the configuration change action candidates determined by the configuration change action candidate determination part 5007 to the user. The configuration change action presentation part 5008 includes a visualization part 5031. The visualization part 5031 visually displays the configuration change action candidates determined by the configuration change action candidate determination part 5007 by using a graph and the like.

The data obtaining part 5009 obtains the configuration information and the monitoring information from the private clouds 1004a to 1004c and the public clouds 1005a to 1005c. The data obtaining part 5009 includes a configuration information obtaining part 5041 and a monitoring information obtaining part 5042. Out of these, the configuration information obtaining part 5041 obtains the configuration information from the clouds and saves the configuration information in the configuration information management table 5002. The monitoring information obtaining part 5042 obtains the monitoring information from the clouds and saves the monitoring information in the monitoring information management table 5004.

<Examples of Tables>

FIGS. 6A to 6F illustrate examples of the various tables illustrated in FIG. 5.

FIG. 6A is an example of the menu information management table 5001. As illustrated in FIG. 6A, the menu information management table 5001 given as an example is formed of one or more records each including items of a cloud 6001, a region 6002, a storage service category 6003, a service type 6004, a unit price 6005, an IOPS unit 6006, a maximum IOPS 6007, a volume capacity specification unit 6008, and a maximum volume capacity 6009. Each record in the menu information management table 5001 corresponds to one of service types to be described later.

An identifier (hereafter, referred to as "cloud ID") of a cloud service provider which provides the cloud service is set in the cloud 6001. An identifier (hereafter, referred to as "region ID") of a region in which the cloud service is provided is set in the region 6002. Information (hereafter, referred to as "storage service category") indicating the category (block storage, file storage, or object storage) of the storage service provided by the cloud service is set in the storage service category 6003.

Information (hereafter, referred to as "service type") indicating the type of storage service provided by the cloud is set in the service type 6004. Information (hereafter, referred to as "unit price defining information") defining a unit pricing method for the service type is set in the unit price 6005. Information (hereafter, referred to as "IOPS unit") indicating the IOPS of the service type is set in the IOPS unit 6006. The maximum IOPS 6007 defines the maximum IOPS provided in the service type.

Information (hereafter referred to as "capacity specification unit") indicating the unit used by the user to specify the capacity is set in the volume capacity specification unit 6008. Note that, when the capacity specification unit is defined in advance in the menu and the user is not allowed to specify the capacity specification unit, a capacity value defined in advance is used as the capacity specification unit. Information (hereafter, referred to as "maximum volume capacity") indicating the maximum value of the volume capacity which can be specified by the user is set in the maximum volume capacity 6009. Note that, when the capacity is defined in advance in the menu and the user does not specify the capacity, a capacity value defined in advance is used as the maximum volume capacity.

FIGS. 6B and 6C are examples of the configuration information management table 5002. FIG. 6B is an example of the configuration information management table 5002 before the execution of the configuration change and FIG. 6C is an example of the configuration information management table 5002 after the execution of the configuration change. As illustrated in FIGS. 6B and 6C, the configuration information management table 5002 includes configuration information on the computing resources (hereafter, referred to as "computing resource configuration information"), configuration information on the storage resources (hereafter, referred to as "storage resource configuration information"), and configuration information on data flow (hereafter referred to as "data flow configuration information").

The computing resource configuration information is formed of one or more records each including items of a node ID 6011, a node type 6012, a group ID 6013, a role 6014, a cloud 6015, and an end point 6016. Each record in the computing resource configuration information corresponds to one of the computing resources.

An identifier (hereafter, referred to as "computing resource ID") for uniquely identifying an instance of the computing resource is set in the node ID 6011 among these items. Information (hereafter, referred to as "node type") indicating the type of the computing resource is set in the node type 6012. Types of computing resource include virtual machine (VM). An identifier (hereafter, referred to as "computing group ID") of a group to which the computing resource belongs is indicated in the group ID 6013. In the embodiment, the group is assumed to a group formed based on a certain application.

Information (hereafter, referred to as "computing role information") indicating the role of the computing resource is set in the role 6014. Note that the computing role information includes information (for example, "App") indicating that the computing resource is running an application program.

The cloud ID of the cloud in which the computing resource is created is set in the cloud 6015. An end point (for example, Internet protocol (IP) address) of the computing resource is set in the end point 6016.

The storage resource configuration information is formed of one more records each including items of a node ID 6021, a group ID 6022, a role 6023, a category 6024, a cloud 6025, a service type 6026, a capacity 6027, a performance 6028, and a data protocol 6029. Each record in the storage resource configuration information corresponds to one of the storage resources.

An identifier (hereafter, referred to as "storage resource ID") for uniquely identifying the storage resource is set in the node ID 6021 among these items. An identifier (hereafter, referred to as "storage group ID") of a group to which the storage resource belongs is set in the group ID 6022. Information (hereafter, referred to as "storage role information") indicating the role of the storage resource is set in the role 6023. Information (hereafter referred to as "storage resource information" indicating the category of the storage resource is set in the category 6024.

The cloud ID of the cloud in which the storage resource is created is set in the cloud 6025. A service type corresponding to the storage resource is set in the service type 6026. A capacity allocated for the storage resource is set in the capacity 6027. Information indicating the performance allocated for the storage resource is set in the performance 6028. Information indicating a data input-output protocol supported by the storage resource is set in the data protocol 6029.

The data flow configuration information is formed of one or more records each including items of a node ID 6031, a coupling destination node ID 6032, a RW type 6033, and a data protocol 6034. Each record of the data flow configuration information corresponds to one of data flows.

The identifiers (computing resource ID and storage resource ID) of the computing resource and the storage resource in a reference relationship are set in the node ID 6031 and the coupling destination node ID 6032, respectively. Information indicating the type (type of read/write) of reading and writing of the dataflow is set in the RW type 6033. Information indicating the protocol used in the data input and output in the data flow is set in the data protocol 6034.

In this example, as illustrated in FIG. 6B, the computing resources and the storage resources managed in the configuration information management table 5002 are all in the cloud of "Private 1" before the execution of the configuration change. Meanwhile, as illustrated in FIG. 6C, the computing resource of the virtual machine VM2 and the storage resources of "Data 5" and "Data 6" are in the cloud of "Public 2" after the execution of the configuration change. In the data protocol 6034, the data protocol 6034 is a block access using FC in "Private 1," while a physical structure such as FC is not recognized in "Public 2."

FIG. 6D is an example of the configuration change action management table 5003. As illustrated in FIG. 6D, the configuration change action management table 5003 given as an example is formed of one or more records each including items of an action ID 6041, a category 6042, a name 6043, a target cloud 6044, a change target 6045, and a candidate parameter 6046. Each record in the configuration change action management table 5003 corresponds to one of the configuration change actions.

An identifier (hereafter, referred to as "configuration change action ID") for uniquely identifying the configuration change action is set in the action ID 6041. Information (hereafter, referred to as "category information") indicating the category of the configuration change action is set in the category 6042. The name of the configuration change action is set in the name 6043.

Information indicating the cloud being the target of the configuration change action is set in the target cloud 6044. Note that, when "Current" is set in the target cloud 6044, this means that the configuration change action is an action on a resource of a cloud in which a storage resource being the target of the configuration change is currently operating. Moreover, when "NonCurrent" is set in the target cloud 6044, this means that the configuration change action is an action on a resource of a cloud other than the cloud in which the storage resource being the target of the configuration change is currently operating.

Information indicating the target of the configuration change is set in the change target 6045. For example, when "service" is set in the change target 6045, this means that the configuration change action is changing of the service type. Meanwhile, when "capacity" is set in the change target 6045, this means that the configuration change action is changing of the capacity of the storage resource.

A candidate value of a parameter after the change is set in the candidate parameter 6046. In the example, changing the capacity to one of the values (candidate values) of "1.0 time, 1.2 times, 1.5 times, and 2.0 times" is set in the candidate parameter 6046 for the configuration change action for which the change target 6045 is "capacity."

FIG. 6E is an example of the configuration change policy management table 5005. As illustrated in FIG. 6E, the configuration change policy management table 5005 given as an example includes items of an index 6051, an item 6052, and a value 6053.

Information indicating an index being the target of the policy is set in the index 6051. In the example, the value of IOPS is managed as the policy. Information indicating an item being a reference of the configuration change policy is set in the item 6052. In the example, an upper limit value of a usage rate (rate of the effective value to the maximum value) of IOPS is set. A reference value to the reference of the configuration change policy is set in the value 6053. In the example, "80%" is set in the value 6053 and this means that the configuration change policy is "the usage rate of IOPS is set to 80% or less".

FIG. 6F is an example of the monitoring information management table 5004. As illustrated in FIG. 6F, the monitoring information management table 5004 includes one or more records each including items of a node ID 6061, a time and date 6062, an IOPS 6063, and a saved data amount 6064. Each record in the monitoring information management table 5004 corresponds to a set of the monitoring information obtained at the same time and date.

The storage resource ID of a storage resource being a monitoring target is set in the node ID 6061. Information indicating the time and date at which the set of monitoring information is obtained is set in the time and date 6062. The effective value (history) of IOPS which is a piece of monitoring information is set in the IOPS 6063. The amount of data saved in the storage resource which is a piece of monitoring information is set in the saved data amount 6064. Note that, for example, Read data amount and Write data amount can be additionally set as monitoring targets.

FIG. 6G is an example of the configuration change candidate management table 5006. As illustrated in FIG. 6G, the configuration change candidate management table 5006 given as an example is formed of one or more records each including items of a resource 6071, a current status 6072, an action 6073, and an estimation of effects after change 6074.

Information for management and identification of each storage resource is set in the resource 6071. As illustrated in FIG. 6G, the resource 6071 includes items of an App ID 6081 and a storage resource ID 6082. An identifier (hereafter, referred to as "application ID") of an application to which the storage resource belongs is set in the App ID 6081 out of these items. Note that the application ID corresponds to the group ID 6022 in the configuration information management table 5002. The storage resource ID is set in the storage resource ID 6082.

Information indicating the status of the storage resource before the configuration change is set in the current status 6072. As illustrated in FIG. 6G, the current status 6072 includes items of a cloud 6091, a service type 6092, a capacity 6093, a saved data amount 6094, an IOPS 6095, an IOPS usage rate 6096, and a cost 6097.

The cloud ID of a cloud in which the storage resource is operating is set in the cloud 6091 among these items. A service type of a storage service provided by the storage resource is set in the service type 6092. A capacity allocated for the storage resource is set in the capacity 6093. An amount of data currently saved in the storage resource is set in the saved data amount 6094. An upper limit value of IOPS allocated for the storage resource is set in the IOPS 6095. A percentage of the effective value of IOPS to the value of IOPS allocated for the storage resource is set in the IOPS usage rate 6096. Cost for the storage resource is set in the cost 6097.

Contents of the configuration change action to be performed on the storage resource are set in the action 6073. As illustrated in FIG. 6G, the action 6073 includes items of an action type 6101, a cloud after change 6102, a service after change 6103, a capacity after change 6104, and an IOPS after change IOPS 6105.

Information indicating the type of the action is set in the action type 6101 among these items. The cloud ID of a cloud in which the storage resource is to operate after the configuration change is set in the cloud after change 6102. The service type of a storage service to be provided by the storage resource after the configuration change is set in the service after change 6103. The capacity of the storage resource after the configuration change is set in the capacity after change 6104. The IOPS of the storage resource after the configuration change is set in the IOPS after change IOPS 6105.

Calculation values of effects to be obtained with the execution of the configuration change action are set in the estimation of effects after change 6074. As illustrated in FIG. 6G, the estimation of effects after change 6074 includes items of an IOPS usage rate after change 6111 and cost after change 6112. A calculation value of a percentage of the effective value of IOPS to the allocated value of IOPS in the configuration after the configuration change set in the IOPS usage rate after change 6111 out of these items. A calculation value of the cost in the configuration after the configuration change is set in the cost after change 6112.

<Explanation of Processing>

Figure 7:
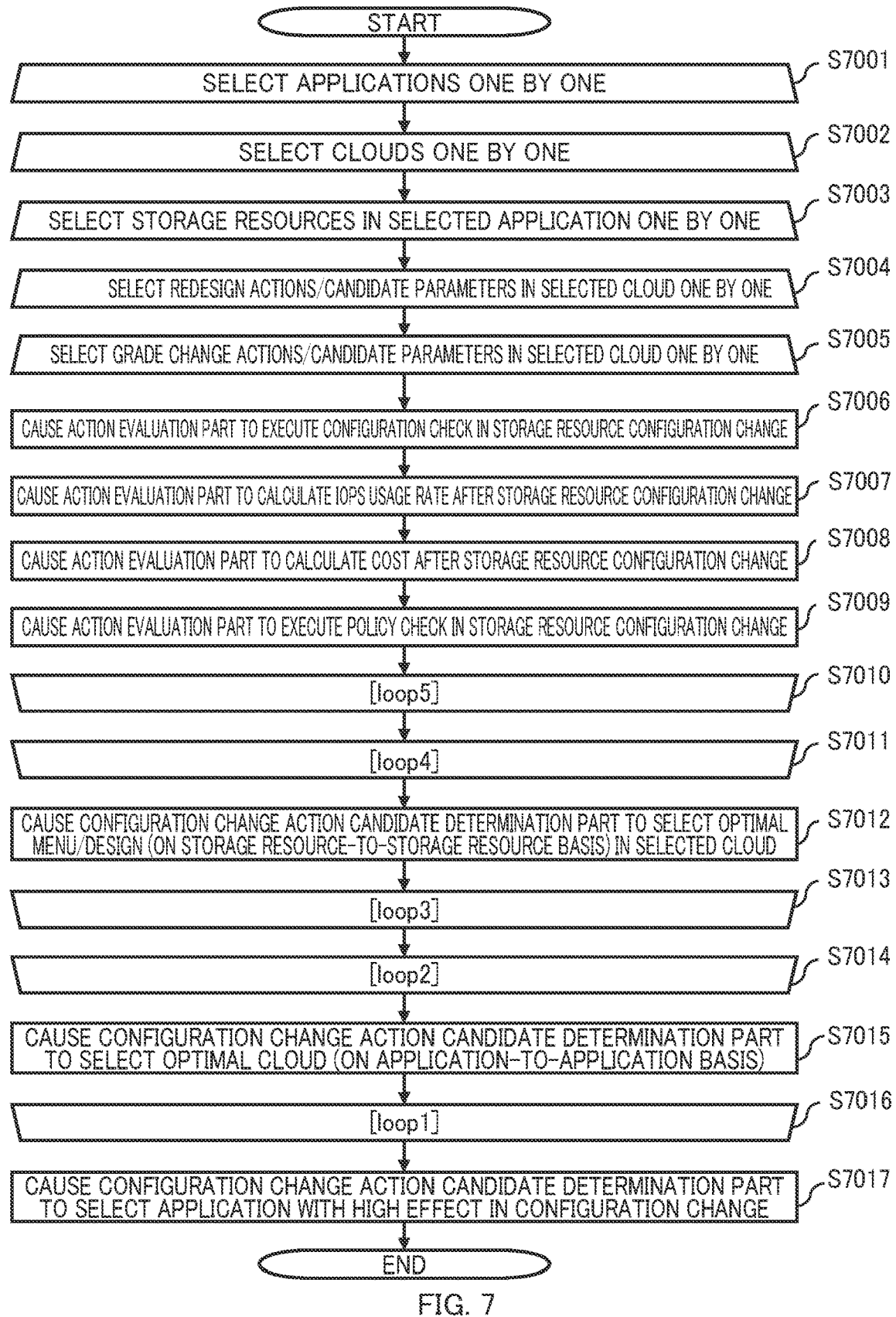
FIG. 7 is a flowchart for explaining configuration change action candidate determination processing.

FIG. 7 is a flowchart for explaining processing performed by the configuration change action candidate determination part 5007 (hereafter, referred to as "configuration change action candidate determination processing S700"). The configuration change action candidate determination part 5007 determines optimal configuration change actions for the storage resources in the applications by performing the configuration change action candidate determination processing S700 on the applications. Note that, in the use of clouds in the embodiment, clouds common to all storage resources in the applications are assumed to be used. Moreover, in the configuration change action candidate determination processing S700, an optimal collection of the configuration change actions is determined on the application-to-application basis. The configuration change action candidate determination processing S700 is described below with reference to FIG. 7.

In S7001 to S7016, the configuration change action candidate determination part 5007 executes loop processing (loop 1) by selecting the applications to be managed one by one. Note that the applications described in the example are applications identified by using the group IDs 6022 in the configuration information management table 5002.

In S7002 to S7014, the configuration change action candidate determination part 5007 performs loop processing (loop 2) by selecting one by one the clouds (clouds 6001 in the menu information management table 5001) for which the configuration change action may be performed.

In S7003 to S7013, the configuration change action candidate determination part 5007 executes loop processing (loop 3) by selecting one by one the storage resources (node IDs 6021 in the configuration information management table 5002) in the application selected as the target in S7001.

In S7004 to S7011, the configuration change action candidate determination part 5007 performs loop processing (loop 4) by selecting actions and candidate parameters (entries of the configuration change action management table 5003) relating to redesign.

In S7005 to S7010, the configuration change action candidate determination part 5007 performs loop processing (loop 5) by selecting one by one actions and candidate parameters (entries of the configuration change action management table 5003) relating to grade changes for the cloud selected in S7002.

In S7006 to S7009, the action evaluation part 5012 evaluates the configuration change action for a combination of the application (selected in S7001), the cloud (selected in S7002), the storage resource (selected in S7003), the redesign action (selected in S7004), and the grade change action (selected in S7005) selected in S7001 to S7005 described above.

First, in S7006, the configuration check part 5023 of the action evaluation part 5012 checks the configuration change. For example, the configuration check part 5023 checks whether the capacity exceeds the capacity upper limit value (maximum volume capacity 6009 in the menu information management table 5001) if the redesign action relating to the capacity is executed.

In S7007, the performance calculation part 5021 of the action evaluation part 5012 obtains the performance values to be obtained with the configuration change. In the embodiment, the performance calculation part 5021 assumes that the effective value of IOPS before the change (IOPS 6063 in the monitoring information management table 5004) is to be maintained after the change, and obtains the percentage (IOPS usage rate after the change) of this effective value (or a representative value such as an average value or a median of the effective values) to the allocated value of IOPS after the change. The allocated value of IOPS after the change is managed in the menu information management table 5001. Note that, when the allocated value of IOPS varies depending on parameters such as the capacity, the performance calculation part 5021 also calculates the allocated value of IOPS.

In S7008, the cost calculation part 5022 of the action evaluation part 5012 calculates the cost after the configuration change. The cost calculation part 5022 calculates the cost based on the unit price information (unit price 6005 in the menu information management table 5001) for the capacity and the menu changed with the action.

In S7009, the policy check part 5024 of the action evaluation part 5012 performs the policy check. For example, the policy check part 5024 checks whether the IOPS usage rate after the change is within a defined range (managed in the configuration change policy management table 5005). Note that the user can cause the management server 1001 to present only the configuration change action in which the configuration change satisfying the required performance is to be performed, as the optimal configuration change action by appropriately setting the policy in the configuration change policy management table 5005.

In S7012, the configuration change action candidate determination part 5007 selects the optimal configuration change action among the configuration change actions including the parameters selected in S7004 to S7005. The optimal configuration change action described herein is, for example, an action with the lowest cost after the configuration change among the actions which have passed the configuration check in S7006 and the policy check in S7009. At this point, the menu and the design values such as the optimal capacity are selected for a certain cloud, on the storage resource-to-storage resource basis (selected for each storage resource in each cloud).

In S7015, the configuration change action candidate determination part 5007 selects optimal configuration change actions in a collection of the configuration change actions including the parameters selected in S7004 to S7005 described above. Specifically, the configuration change action candidate determination part 5007 compares the configuration change actions and selects the optimal configuration change actions for each cloud. The optimal configuration change actions in this case are, for example, the configuration change actions for the respective storage resources in the application which have passed the configuration check in S7006 and the policy check in S7009 and whose total cost after the configuration change is the lowest. At this point, a collection of the optimal configuration change actions is selected on the application-to-application basis (group-to-group basis) including one or more storage resources.

In S7017, the configuration change action candidate determination part 5007 selects the collections of the optimal configuration change actions with the highest effect in the configuration change among the collections of the optimal configuration change actions for the respective applications. For example, the configuration change action candidate determination part 5007 selects the collections in the descending order of the amount of cost reduction made by the configuration change. The collections of the optimal configuration change actions selected as described above are saved in the configuration change candidate management table 5006. In this case, when the cloud to be used after the configuration change is the same cloud as that used before the configuration change, the configuration change action candidate determination part 5007 saves the aforementioned collections as grade change actions (entries of the configuration change action management table 5003). Meanwhile, when the cloud to be used after the configuration change is different from the cloud used before the configuration change, the configuration change action candidate determination part 5007 saves the aforementioned collections as migration-grade change actions (entries of the configuration change action management table 5003). Moreover, when the capacity of any of the storage resources is to be changed, the configuration change action candidate determination part 5007 saves the aforementioned collections as capacity redesign actions (entries of the configuration change action management table 5003). Note that the action relating the changing of the grade and the action relating to the changing of the capacity may be simultaneously applied.

Note that, although loop processing with simple nesting is performed in the configuration change action candidate determination processing S700 described above, the processing can be made more efficient by, for example, skipping the loop for the actions which do not pass the policy check. Moreover, for cloud menus in which only the magnitude relationships of cost/performance are defined, when a menu of the lower grade satisfies the policy (when the lower-grade menu is sufficient and there is no need to test the higher-grade menu), a menu of the higher grade may be excluded from the action candidates.

As described above, the configuration change action candidate determination part 5007 selects the collection of the optimal configuration change actions for each application (S7015). Accordingly, for example, when the actions do not improve at least one of the performance and the cost for one or more of the storage resources used by the application but improve at least one of the performance and the cost in the application as a whole, the actions are determined as the recommended candidates on the application-to-application basis and the optimal configuration change actions can be determined from the viewpoint on the application-to-application basis (that is, viewpoint of the user or the manager of the application).

<Example of GUI>

Figure 8A:
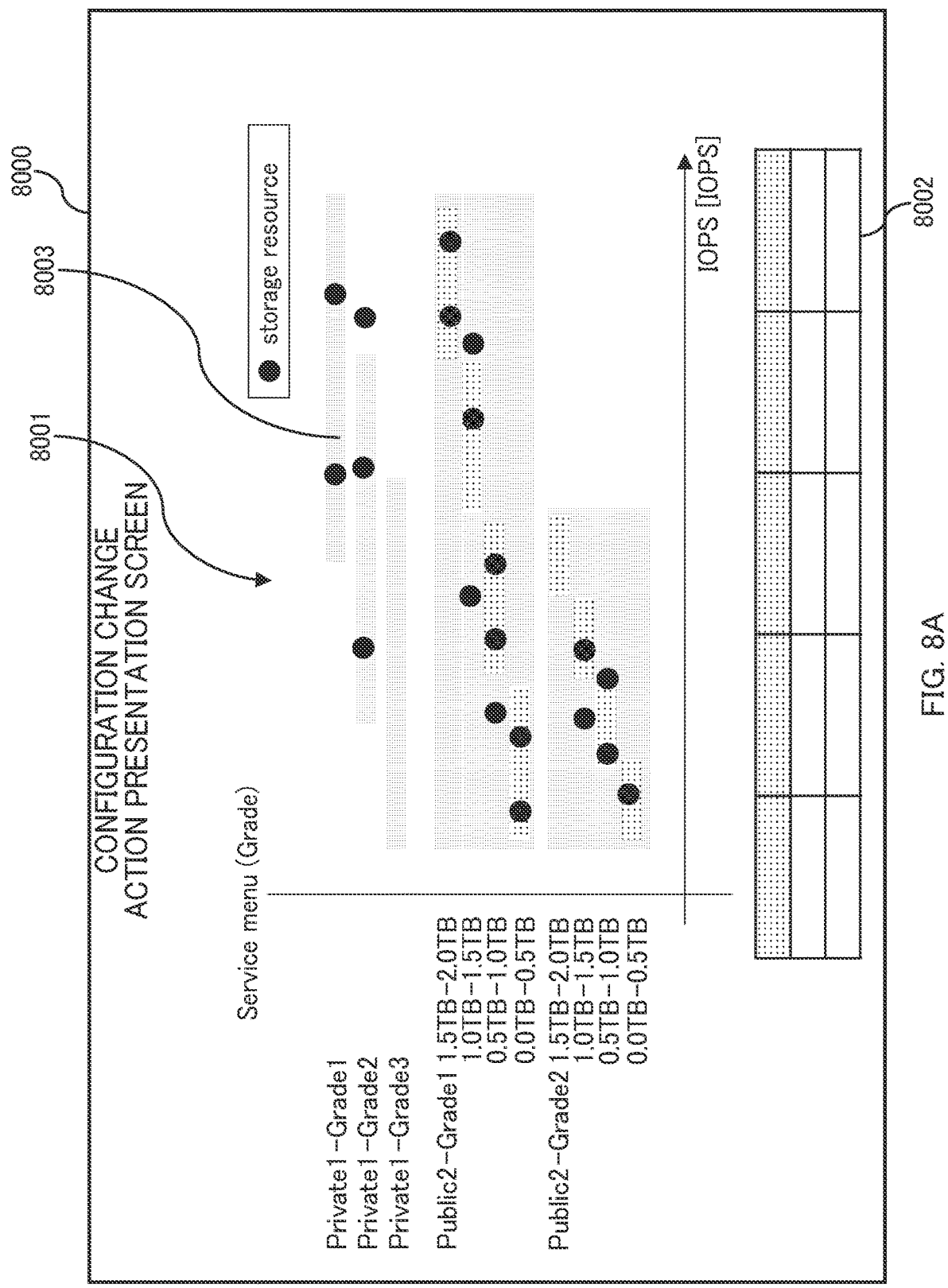
FIG. 8A is a view illustrating a configuration of a GUI.
Figure 8B:
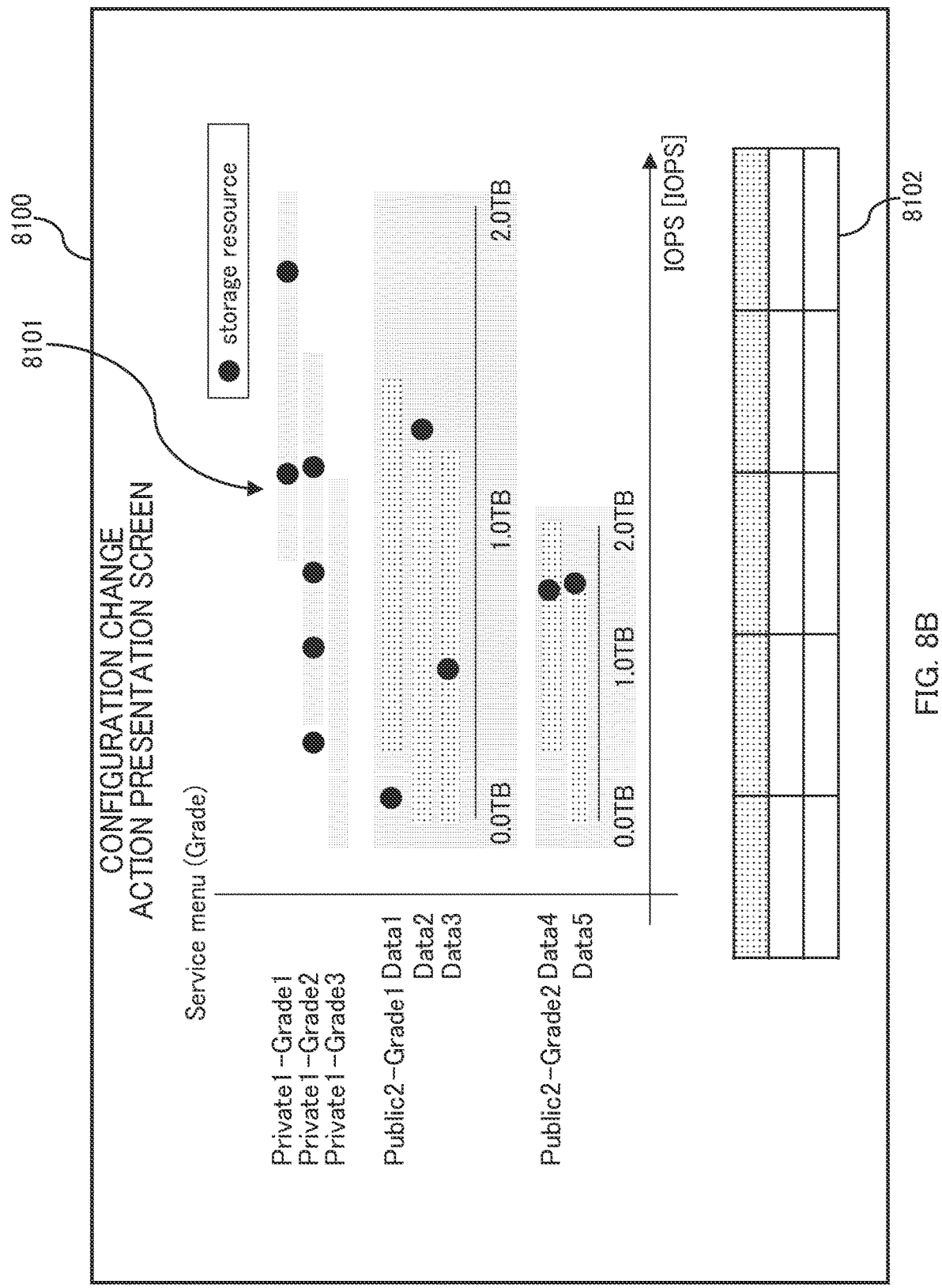
FIG. 8B is a view illustrating another configuration of the GUI.

FIGS. 8A and 8B illustrate examples of a graphical user interface (GUI) displayed by the visualization part 5031 of the configuration change action presentation part 5008 in the management server 1001. On a screen (hereafter, referred to as "configuration change action presentation screen 8000") given as an example, there are displayed a graph 8001 and contents 8002 of the configuration change candidate management table 5006. The horizontal axis of the graph 8001 represents the range of IOPS and the vertical axis represents the types of the menus. Each dot (black circle) in the graph 8001 represents the recorded value of the IOPS of the storage resource in the corresponding menu. The storage resources to be preferentially handled and the contents of handling (changing of the service menu and the like) are comprehensively displayed in the graph 8001.

In this example, in the horizontal axis, the range (upper limit/lower limit) 8003 of the IOPS in each menu defined by the policy and the like is displayed instead of the maximum IOPS. Moreover, in the vertical axis, some of the menus are displayed while being divided into segments for the respective capacity ranges (for example, 1.5 TB to 2.0 TB and the like). This is because, in some of the contents of the menus, the upper limit value of the IOPS varies depending on the capacity.

The sizes and colors of the dots do not have to be uniform. For example, the sizes and the colors of the dots may vary depending on the value of the cost of the corresponding storage resources. Although the appropriate ranges of IOPS are displayed for the respective menus in the graph 8001 given as an example, the colors of the ranges do not have to be uniform. For example, the colors may vary depending on the value of the unit price.

On a screen (hereafter, referred to as "configuration change action presentation screen 8100") illustrated in FIG. 8B, there are displayed a graph 8101 and contents 8102 of the configuration change candidate management table 5006. The display contents of the configuration change action presentation screen 8100 in FIG. 8B are substantially the same as the contents of the configuration change action presentation screen 8000 in FIG. 8A. The configuration change action presentation screen 8100 in FIG. 8B is different from the configuration change action presentation screen 8000 in FIG. 8A in that, in the vertical axis, the storage resources are displayed for some of the menus. This is because the upper limit value of the IOPS varies depending on the capacity in some of the menus.

As described above, the management server 1001 of the embodiment calculates the changes in performance and cost after the execution of the actions based on the menu information, the configuration information, and the monitoring information and determines the actions which improve at least one of the performance and the cost as the recommended candidates. Accordingly, the management server 1001 can present the optimal cloud usage configuration to the user while considering the specification characteristics, cost characteristics, coupling characteristics, and the like of the storage resources. Thus, the user can efficiently and appropriately select, for example, the optimal cloud usage configuration.

Note that, the configuration change candidate management table 5006 may manage information (work cost, lead time, and the like) on load generated when the configuration change action executed, in addition to the various pieces of information such as the current status 6072, the action 6073, and the estimation of effects after change 6074.

Moreover, although the range of IOPS usage rate is given as an example of the policy in the configuration change policy management table 5005 and the policy check part 5024 in the embodiment, for example, a policy explicitly specifying the cloud usable for each application is conceivable as another example of the policy.

Although the configuration change actions are determined based on the current operation status of the IT resources in the configuration change action candidate determination processing S700 of FIG. 7, it is possible to determine the configuration change actions based on future operation status of the IT resources estimated by the operation data estimation part 5011 by using a publicly-known time-series estimation method or the like based on the monitoring information in the monitoring information management table 5004.

Second Embodiment

Next, the second embodiment is described. The management server 1001 of the second embodiment determines, for the storage resources of different types (also having different interfaces), a portion where the configuration change can be relatively easily performed, based on a reference relationship of data in the application, and presents the configuration change actions based on the determined portion to the user. Note that the configuration of the information processing system 1 on which the second embodiment is based is the same as that in FIG. 1. Portions different from the first embodiment are mainly described below.

Figure 9:
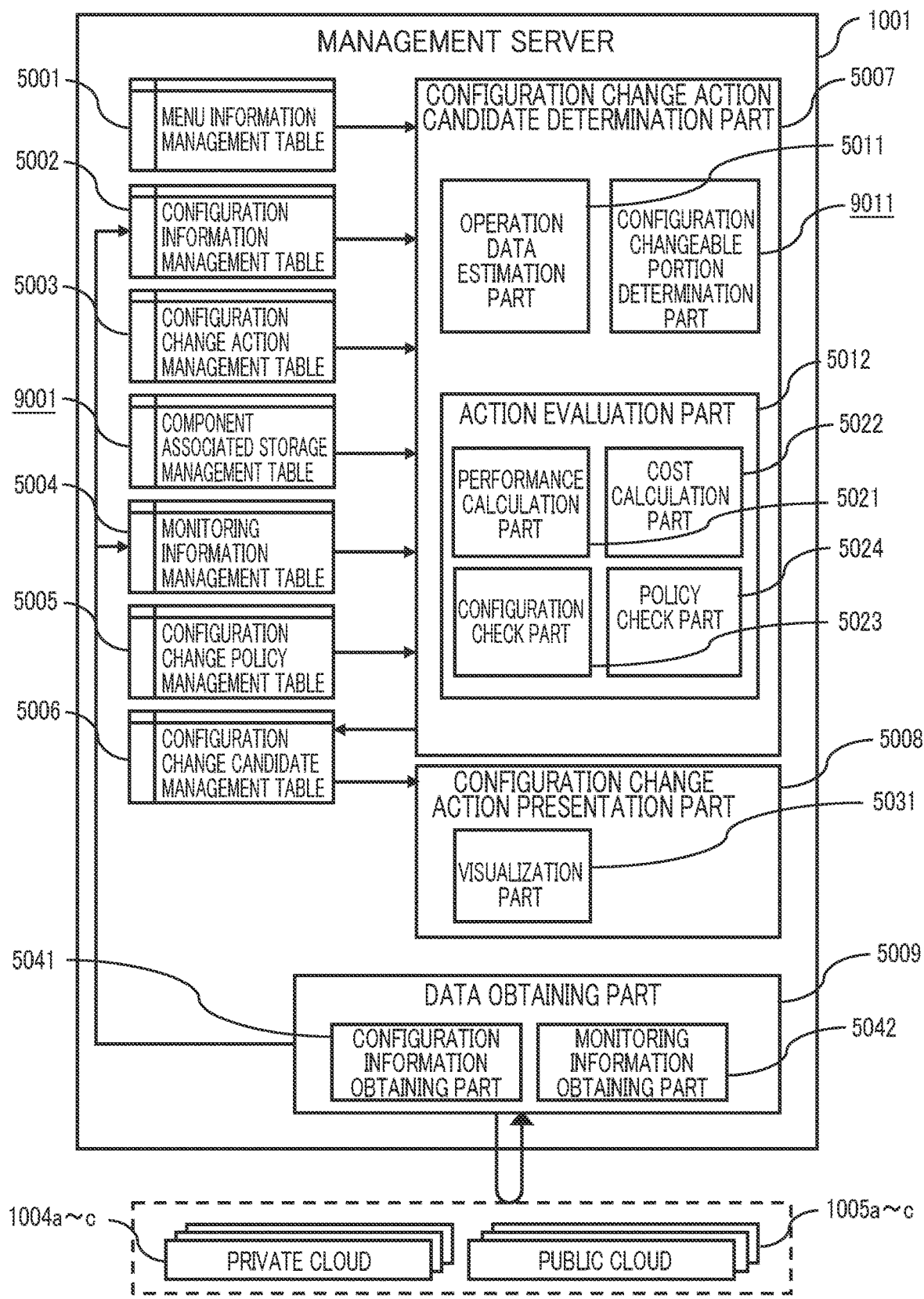
FIG. 9 is a view illustrating main functions of a management server in a second embodiment and main data stored in the management server.

FIG. 9 illustrates the configuration of the management server 1001 in the second embodiment. As illustrated in FIG. 9, the management server 1001 of the second embodiment includes a configuration changeable portion determination part 9011 in addition to the configuration of the management server 1001 of the first embodiment illustrated in FIG. 5. Moreover, the management server 1001 of the second embodiment stores a component associated storage management table 9001 in addition to the tables stored in the management server 1001 of the first embodiment.

The configuration changeable portion determination part 9011 determines the portion where the configuration change can be relatively easily performed, based on the reference relationship of data in the application. The component associated storage management table 9001 manages information indicating a front end and a back end of an interface for each of the types (hereafter, referred to as components) of storage resources and computing resources.

FIGS. 10A to 10E illustrate examples of the various tables stored in the management server 1001 of the second embodiment. Note that tables which are stored in the management server 1001 but are not illustrated are the same tables as those in the first embodiment.

FIG. 10A is an example of the menu information management table 5001 stored in the management server 1001 of the second embodiment. The configurations of the items are the same as those in the first embodiment. As illustrated in FIG. 10A, the menu information management table 5001 given as an example includes records on file storages and object storages (records for which "File" and "Object" are set in the storage service category 6003).

FIGS. 10B and 10C are examples of the configuration information management table 5002 stored in the management server 1001 of the second embodiment. The configurations of the items are the same as those in the first embodiment. As illustrated in FIGS. 10B and 10C, the configuration information management table 5002 given as an example includes records on the file storages and the object storages (records for which "File (NFS)" and "Object (Public 2)" are set in the data protocol 6029 and the data protocol 6034.

FIG. 10D is an example of the component associated storage management table 9001 stored in the management server 1001 of the second embodiment. As illustrated in FIG. 10D, the component associated storage management table 9001 is formed of one or more records each including items of a role 1501, a front end 1502, and a back end 1503. Each record in the component associated storage management table 9001 corresponds to one of the components (nodes).

Information indicating the role of the component is set in the role 1501 among the aforementioned items.

As illustrated in FIG. 10D, the front end 1502 includes items of a cloud 1511 and a data protocol 1512. The cloud ID of a cloud which is handled as the front end by the node with the role in the node 1501 is set in the cloud 1511 out of these items. Information indicating a data protocol which is handled as the front end by the node with the role in the node 1501 is set in the data protocol 1512.

Information indicating the type of storage resource used by the node is set in the back end 1503. As illustrated in FIG. 10D, the back end 1503 includes items of a cloud 1521 and a data protocol 1522. The cloud ID of a cloud which is handled as the back end by the node with the role in the node 1501 is set in the cloud 1521 out of these items. Information indicating a data protocol which is handled as the back end by the node with the role in the node 1501 is set in the data protocol 1522.

FIG. 10E is an example of the configuration change action management table 5003 stored in the management server 1001 of the second embodiment. The configurations of the items are the same as those in the first embodiment. As illustrated in FIG. 10E, the configuration change action management table 5003 given as an example includes an action of changing the setting in the node (record in which the action ID 6041 is "Action 4").

FIG. 10F is an example of the configuration change candidate management table 5006 stored in the management server 1001 of the second embodiment. The configurations of the items are the same as those in the first embodiment. As illustrated in FIG. 10F, the configuration change candidate management table 5006 given as an example includes contents of changing the type of the storage resource (record in which the App ID 6081 is "App3").

Figure 11:
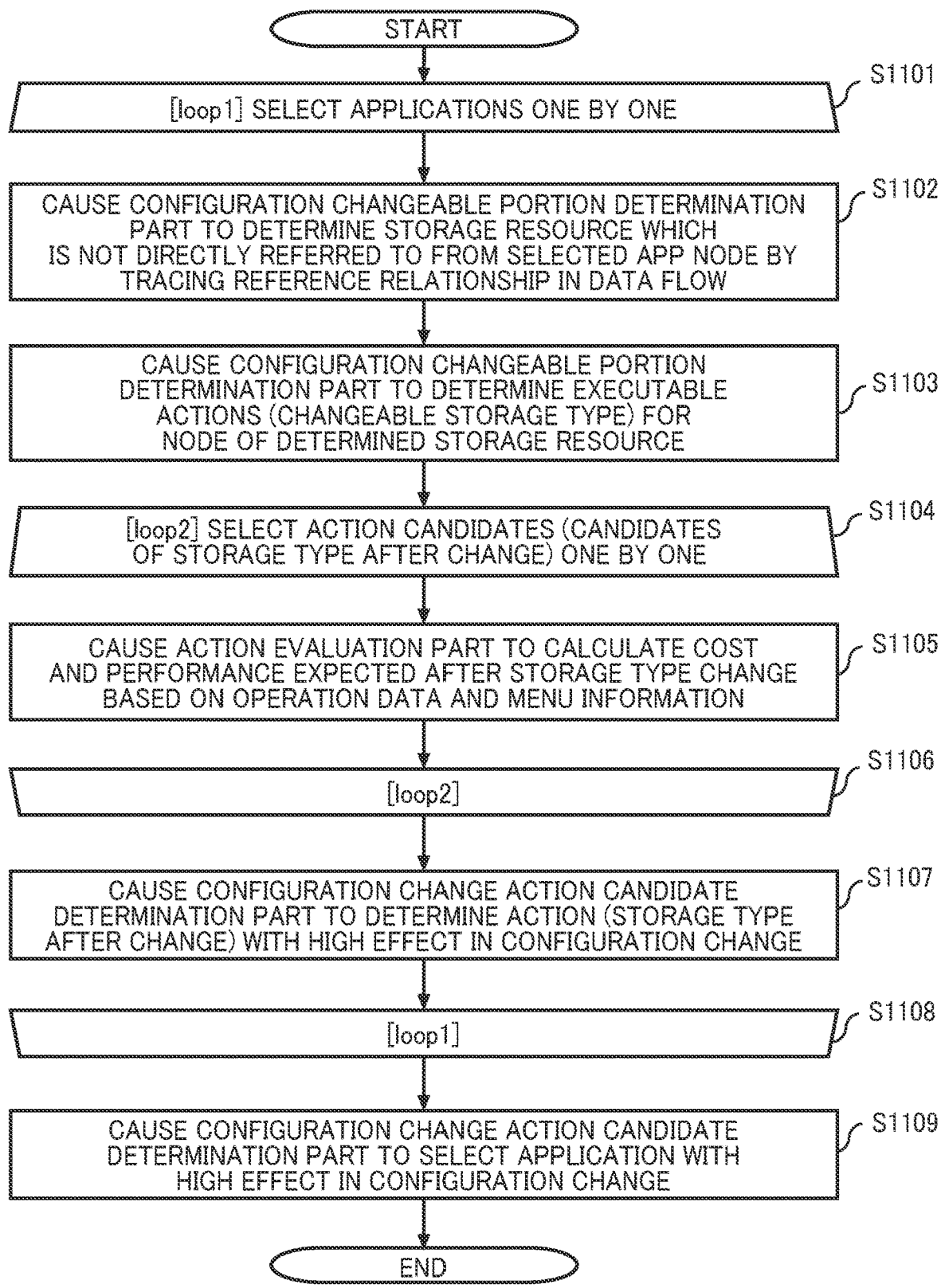
FIG. 11 is a flowchart for explaining configuration change action candidate determination processing in the second embodiment.

FIG. 11 is a flowchart for explaining processing (hereafter, referred to as "configuration change action candidate determination processing S1100") performed by the configuration change action candidate determination part 5007 of the second embodiment.

In S1101 to S1108, the configuration change action candidate determination part 5007 executes loop processing (loop 1) by selecting the applications (managed in the configuration information management table 5002) to be managed one by one.

In S1102, the configuration changeable portion determination part 9011 determines a storage resource which is not directly referred to from the App node of the selected application by tracing the reference relationship (data flow) of the data managed in the configuration information management table 5002. Specifically, for example, the configuration changeable portion determination part 9011 performs graph search with the App node being the starting point and determines a node which can be reached when the data flow is viewed as an undirected graph but cannot be reached when the data flow is viewed as a directed graph, as the storage resource which is not directly referred to from the App node.

In S1103, the configuration changeable portion determination part 9011 determines configuration change actions which cause setting changes in which the type of the storage resource determined in S1102 is changed, based on the role information (role 6014 and role 6023 in the configuration information management table 5002 and the like) of the storage resources and the information in the component associated storage management table 9001.

In S1104 to S1106, loop processing (loop 2) is performed by selecting the configuration change actions (storage types being candidates of the storage type after the configuration change) determined in S1103 one by one.

In S1105, the action evaluation part 5012 calculates effects to be obtained after the configuration change for a combination of the application (S1101), the storage resource (S1102), and the storage type being the candidate of the storage type after the configuration change (S1104) determined in S1101 to S1104. Specifically, the action evaluation part 5012 calculates the performance and cost expected after the configuration change based on the operation data (monitoring information management table 5004) and the menu information (menu information management table 5001) of the storage resource.

In S1107, the configuration change action candidate determination part 5007 determines the configuration change action with the highest effect (for example, the greatest cost reduction amount) in the configuration change.

In S1109, the configuration change action candidate determination part 5007 determines the application with the highest effect (for example, the greatest cost reduction amount) in the configuration change. Note that the configuration change action candidate determination part 5007 saves the collection of the determined optimal configuration change actions in the configuration change candidate management table 5006.

Figure 12:
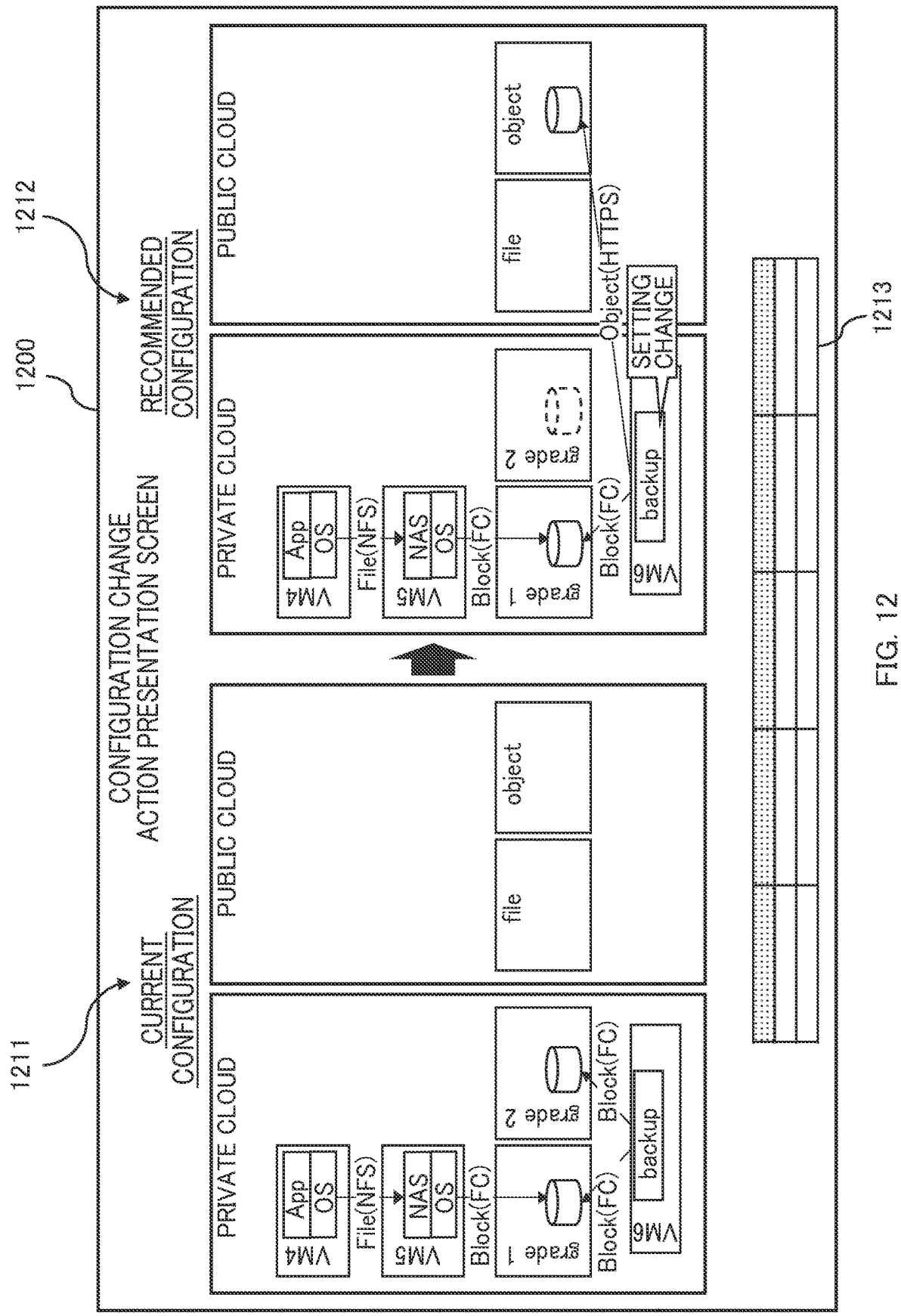
FIG. 12 is a view illustrating a configuration of a GUI in the second embodiment.

FIG. 12 illustrates an example of a GUI displayed by the visualization part 5031 of the configuration change action presentation part 5008 in the management server 1001 of the second embodiment. On a screen (hereafter, referred to as "configuration change action presentation screen 1200") given as an example, a current configuration 1211 of an application and a recommended configuration 1212 are displayed. Moreover, contents 1213 of the configuration change candidate management table 5006 is displayed on the configuration change action presentation screen 1200. The user can check the contents of the recommended configuration (optimal configuration change action) on the configuration change action presentation screen 1200 and efficiently select the optimal cloud usage configuration.

Third Embodiment

Next, the third embodiment is described. The management server 1001 of the third embodiment determines the recommended configuration change actions by using history information on the configuration changes executed in the past. Note that the configuration of the information processing system 1 on which the third embodiment is based is the same as that in FIG. 1. Portions different from the first or second embodiment are mainly described below.

Figure 13:
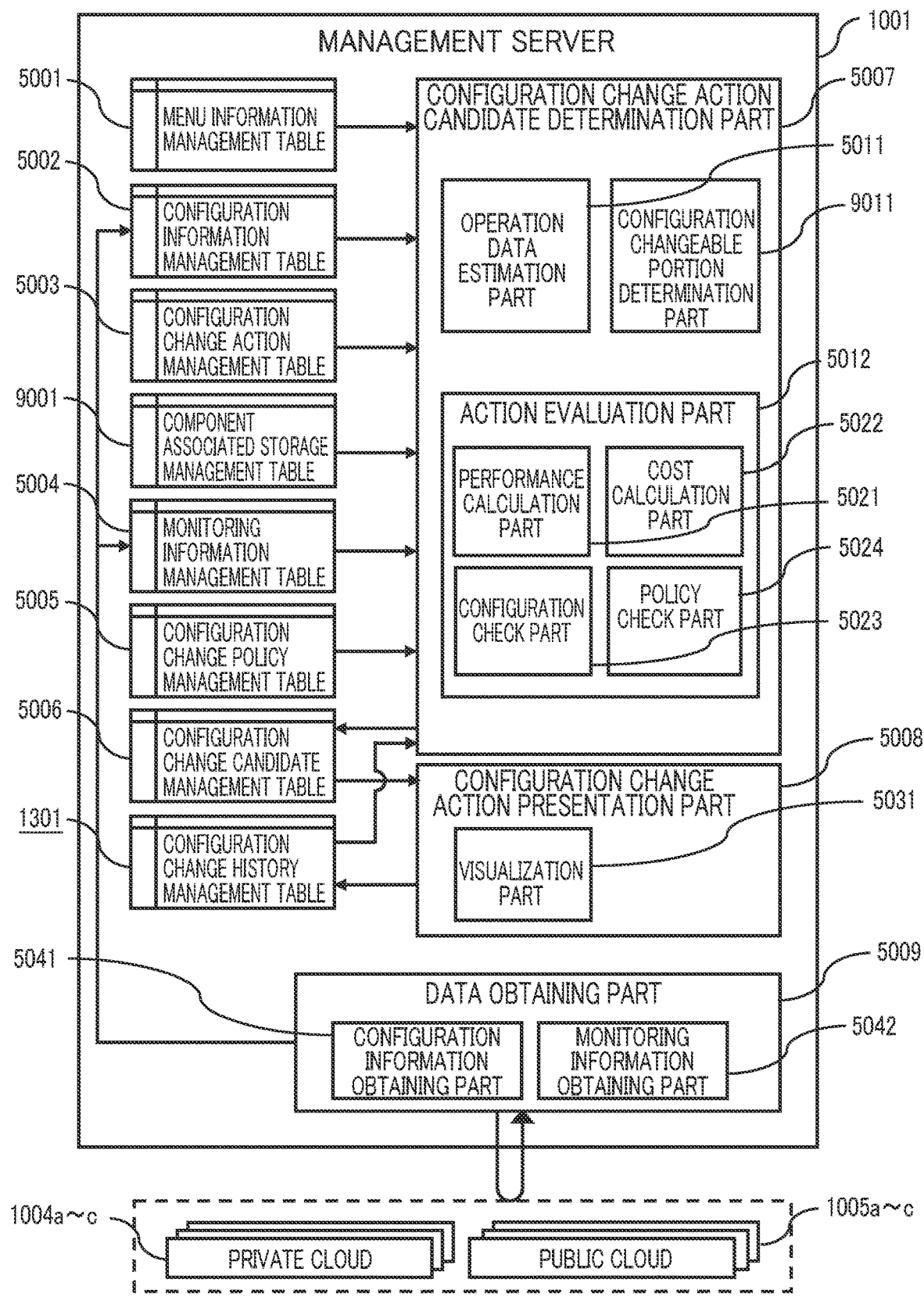
FIG. 13 is a view illustrating main functions of a management server in a third embodiment and main data stored in the management server.

FIG. 13 illustrates a configuration of the management server 1001 in the third embodiment. As illustrated in FIG. 13, the management server 1001 of the third embodiment stores a configuration change history management table

1301 in addition to the configuration of the management server 1001 of the second embodiment illustrated in FIG. 9.

The configuration change history management table 1301 manages information on the history of the past configuration changes. For example, the configuration change history management table 1301 manages the contents of the configuration change actions presented by the configuration change action presentation part 5008. Moreover, the configuration change history management table 1301 manages information on results of determination in which the configurations are determined not to be changed.

FIGS. 14A and 14B are examples of tables stored in the management server 1001 of the third embodiment. Note that tables which are stored in the management server 1001 but are not illustrated are the same tables as those in the first or second embodiment.

FIG. 14A is an example of the configuration change history management table 1301 stored in the management server 1001 of the third embodiment. As illustrated in FIG. 14A, the configuration change history management table 1301 includes one or more records each formed of items of a change ID 1401, a reference to monitoring information 1402, an application type 1403, a storage category after change 1404, and a storage after change 1405. Each record in the configuration change history management table 1301 corresponds to one of the configuration changes.

A change ID which is an identifier of each configuration change is set in the change ID 1401. A reference (monitoring information ID to be described later) to the monitoring information referred to when the configuration change has been considered is set in the reference to monitoring information 1402. Information indicating the type of the application for which the configuration change has been considered is set in the application type 1403. Information indicating the storage category after the configuration change is set in the storage category after change 1404. Note that, when the configuration change is not performed, information indicating that effect ("no change is executed" in this example) is set in the storage category after change 1404. Information indicating the service type after the configuration change is stored in the storage after change 1405.

FIG. 14B is an example of the monitoring information management table 5004 stored in the management server 1001 of the third embodiment. The monitoring information management table 5004 of the third embodiment includes items of a monitoring information ID 1411, a Read data amount 1412, and a Write data amount 1413, in addition to the items in the monitoring information management table 5004 in the first embodiment illustrated in FIG. 6F. Each record in the monitoring information management table 5004 corresponds to one of the sets of the monitoring information.

An identifier (hereafter, referred to as "monitoring information ID") of the monitoring information is set in the monitoring information ID 1411. The time and date 6062, the IOPS 6063, and the saved data amount 6064 are the same as those in the first embodiment. Note that a metric is set for each of the IOPS 6063, the saved data amount 6064, the Read data amount 1412, and the Write data amount 1413. An observed value of the effective value of IOPS is set in the IOPS 6063, an observed value of the saved data amount is set in the saved data amount 6064, an observed value of the read data amount is set in the Read data amount 1412, and an observed value of the written data amount is set in the Write data amount 1413. Note that the monitoring information management table 5004 may further include matric values other than those given as an example.

The configuration change action candidate determination part 5007 compares the monitoring information on the operating storage resource (contents of the monitoring information management table 5004 in FIG. 6F) with the monitoring information on the other storage resources (contents of the monitoring information management table 5004 in FIG. 14B), determines the monitoring information on the other storage resources which is similar to the monitoring information on the operating storage resource, obtains the contents of the configuration change performed for the determined monitoring information from the configuration change history management table 1301, and presents the configuration change actions based on the obtained contents to the user as the configuration change action candidates.

As described above, proven configuration change actions can be presented to the user as the configuration change action candidates by using the configuration change actions selected based on the contents of the configuration changes performed for the past monitoring information similar to the monitoring information, as the configuration change action candidates.

Note that, although the monitoring information on the operating storage resource is compared with the monitoring information on the configuration changes of the other storage resources to obtain the configuration change actions in the aforementioned example, other methods are conceivable. For example, the following method may be employed. Machine learning is performed by using the categories in the storage category after change 1404 of the configuration change history management table 1301 as labels and using a feature amount (for example, an average value, a median value, a variance value, a gradient of an increase or a decrease, or the like) of the monitoring information in the monitoring information management table 5004 as training data and an appropriate area (or determination curve) is obtained for each label in advance (for example, by the configuration change action candidate determination part 5007). Then, the appropriate area including (the feature amount of) the monitoring information on the operating storage resource is determined. Next, the configuration change action candidate determination part 5007 obtains the contents of the configuration change performed for the monitoring information corresponding to the determined appropriate area from the configuration change history management table 1301 and determines the action based on the obtained contents of the configuration change as the recommended candidate.

When the machine learning is used as described above, the learning progresses as the amount of learning data increases and the optimal configuration change action can be accurately determined.

Note that the present invention is not limited to the aforementioned embodiments and includes various modified examples. For example, the aforementioned embodiments are described in detail to facilitate the understanding of the present invention and the present invention is not necessarily limited to embodiments including all of the configurations described above. Moreover, some of the configurations in one embodiment may be replaced by the configurations in the other embodiments and the configurations of one embodiment may be added to the configurations of the other embodiments. Furthermore, some of the configurations of the embodiments can be deleted or replaced or other configurations can be added thereto.

The configurations, functions, processing parts, processing means, and the like described above may be partially or entirely implemented by hardware obtained by, for example, designing an integrated circuit. The configurations, functions, and the like described above may be implemented by software by causing a processor to interpret and execute programs configured to implement the functions. Information such as programs, tables, files, and the like for implementing the functions may be stored in a memory, a storage unit such as a hard disk drive or a SSD, or a recording medium such as an IC card, a SD card, a DVD, or a BD.

Only the control lines and information lines assumed necessary for the explanation are illustrated and not all control lines and information lines in a product are necessarily illustrated. It is possible to assume that, in actual, almost all of the configurations are coupled to one another.

Although the present disclosure has been described with reference to example embodiments, those skilled in the art will recognize that various changes and modifications may be made in form and detail without departing from the spirit and scope of the claimed subject matter.

What is claimed is:

1. A cloud usage assisting apparatus comprising:
   a processor;
   a memory; and
   a storage unit configured to store:
      menu information including information on a plurality of menu options for a service using storage resources provided by one or more clouds, the menu options varying in at least one of performance and cost of the service,
      storage resource configuration information which is information on configurations of the storage resources,
      monitoring information including history information on performances of the storage resources, and
      configuration change action information which is information on actions of configuration changes executable on the storage resources, the actions of configuration changes including changing of the menu options involving one of the one or more clouds, changing of the menu options involving different clouds of the one or more clouds, and changing of a parameter that changes configurations of the storage resources in the menu options;
   wherein the processor is configured to:
      calculate changes in the performance and the cost of the service which are expected to occur when each of the actions is executed and the configuration changes are made, based on the menu information, the storage resource configuration information, and the monitoring information, and
      determine an action, from the actions of configuration changes, as a recommended candidate when the determined action is expected to improve at least one of the performance and the cost of the service.

2. The cloud usage assisting apparatus according to claim 1, wherein
   the storage unit further stores policy information which is information on a policy defining a requested performance range of the service, and
   the processor is further configured to determine an action, from the actions of configuration changes, as the recommended candidate when the expected performance of the service, after the configuration change for the determined action, satisfies the policy.

3. The cloud usage assisting apparatus according to claim 2, wherein the policy information includes definition information on input output per second (IOPS) of each of the storage resources.

4. The cloud usage assisting apparatus according to claim 1, wherein the storage resource configuration information includes information indicating groups to which the storage resources belong, and
   the processor is further configured to:
      calculate expected changes in at least one of the performance and the cost of the service when each of the actions, from the actions of configuration changes, is executed on each group; and
      determine, as the recommended candidate, an action that is expected to improve at least one of the performance and the cost of the service on at least one of the groups as a whole.

5. The cloud usage assisting apparatus according to claim 1, further comprising a graphical user interface (GUI) configured to present the determined action, wherein
   the GUI includes a visualization part configured to display a graph illustrating relationships between the menu options and the monitoring information, and
   the visualization part further displays the graph in at least one of a display mode in which values indicating the performances of the storage resources are plotted on the graph for each of the menu options, a display mode in which the values indicating the performances of the storage resources are plotted for predetermined ranges of the parameter that changes configurations of the storage resources in the menu options, or a display mode in which the values indicating the performances of the storage resources are plotted for each of the storage resources in the menu options.

6. A cloud usage assisting method of causing an information processing apparatus including a processor and a memory to execute the steps of:
   storing
      menu information including information on a plurality of menu options for a service using storage resources provided by one or more clouds, the menu options varying in at least one of performance and cost of the service,
      storage resource configuration information which is information on configurations of the storage resources,
      monitoring information including history information on performances of the storage resources, and
      configuration change action information which is information on actions of configuration changes executable on the storage resources, the actions of configuration changes including changing of the menu options involving one of the one or more clouds, changing of the menu options involving different clouds of the one or more clouds, and changing of a parameter that changes configurations of the storage resources in the menu options; and
   calculating changes in the performance and the cost of the service which are expected to occur when each of the actions are executed and the configuration changes are made, based on the menu information, the storage resource configuration information, and the monitoring information, and determining an action, from the actions of configuration changes, as a recommended candidate when the determined action is expected to improve at least one of the performance and cost of the service.

7. The cloud usage assisting method according to claim 6, wherein the information processing apparatus further executes the steps of:

storing policy information which is information on a policy defining a requested performance range for the service;

determining an action, from the actions of configuration changes, as the recommended candidate when the expected performance of the service after the configuration change for the determined action satisfies the policy.

8. The cloud usage assisting method according to claim 6, wherein the storage resource configuration information includes information indicating groups to which the storage resources belong, the information processing apparatus further executes steps of:

calculating expected changes in the performance and the cost of the service when each of the actions, from the actions of configuration chances, is executed on each group; and determining as the recommended candidate, an action that is expected to improve at least one of the performance and the cost of the service on at least one of the groups as a whole.

9. The cloud usage assisting method according to claim 6, wherein the information processing apparatus further executes the steps of:

displaying a graph illustrating relationships between the menu options and the monitoring information, and displaying the graph in at least one of a display mode in which values indicating the performances of the storage resources are plotted on the graph for each of the menu options, a display mode in which the values indicating the performances of the storage resources are plotted for predetermined ranges of the parameter that changes configurations of the storage resources in the menu options, or a display mode in which the values indicating the performances of the storage resources are plotted for each of the storage resource in the menu options.

* * * * *